United States Patent
Mochizuki et al.

(10) Patent No.: US 9,519,842 B2
(45) Date of Patent: Dec. 13, 2016

(54) APPARATUS AND METHOD FOR MANAGING AN OBJECT EXTRACTED FROM IMAGE DATA

(71) Applicant: CANON KABUSHIKI KAISHA, Tokyo (JP)

(72) Inventors: Yugo Mochizuki, Kawasaki (JP); Kiyoshi Umeda, Kawasaki (JP); Yusuke Hashii, Tokyo (JP); Hiroyasu Kunieda, Yokohama (JP); Hiroyuki Sakai, Chigasaki (JP); Naoki Sumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 545 days.

(21) Appl. No.: 13/934,970

(22) Filed: Jul. 3, 2013

(65) Prior Publication Data
US 2014/0010465 A1    Jan. 9, 2014

(30) Foreign Application Priority Data
Jul. 9, 2012    (JP) ................................. 2012-153669

(51) Int. Cl.
*G06K 9/62*    (2006.01)
*G06K 9/00*    (2006.01)
*G06T 11/60*    (2006.01)

(52) U.S. Cl.
CPC ......... *G06K 9/6267* (2013.01); *G06K 9/00221* (2013.01); *G06T 11/60* (2013.01)

(58) Field of Classification Search
CPC .... G06K 9/00221; G06K 9/6267; G06T 11/60
See application file for complete search history.

(56) References Cited

U.S. PATENT DOCUMENTS 7,555,148 B1 *    6/2009    Steinberg .......... G06F 17/30247
                                        340/5.53
2005/0286797 A1 *  12/2005   Hayaishi .............. H04N 5/3675
                                        382/274

(Continued)

FOREIGN PATENT DOCUMENTS

JP    H05-197793 A    8/1993
JP    H08-63597 A    3/1996

(Continued)

*Primary Examiner* — Edward Park
(74) *Attorney, Agent, or Firm* — Canon USA, Inc. IP Division

(57) ABSTRACT

An apparatus includes a first management unit configured to classify and manage feature information of a plurality of objects extracted from image data in units of similar feature information, a second management unit configured to classify and manage the plurality of objects extracted from the image data object by object, an association unit configured to associate classifications of the objects by the second management unit with classifications of the feature information by the first management unit, and an input unit configured to input a correction instruction about the classifications of the objects by the second management unit, wherein the association unit is configured to, if the correction instruction is input, update an association between the classifications of the objects and the classifications of the feature information and the second management unit is configured to correct and manage the classifications of the objects based on updating of the association.

19 Claims, 40 Drawing Sheets

(56) References Cited

U.S. PATENT DOCUMENTS

| | | | | |
|---|---|---|---|---|
| 2007/0057966 A1* | 3/2007 | Ohno | ................ | G06F 17/3028 345/619 |
| 2008/0075336 A1* | 3/2008 | Luo | ................ | G06K 9/00221 382/118 |
| 2009/0040340 A1* | 2/2009 | Nakase | ............ | G06F 17/30265 348/231.3 |
| 2009/0184982 A1* | 7/2009 | Takakura | ............... | H04N 5/772 345/681 |
| 2010/0074540 A1* | 3/2010 | Tang | ................ | G06K 9/00677 382/225 |

FOREIGN PATENT DOCUMENTS

| | | |
|---|---|---|
| JP | H08-77334 A | 3/1996 |
| JP | 2541688 B2 | 10/1996 |
| JP | H11-53525 A | 2/1999 |
| JP | H11-250267 A | 9/1999 |
| JP | P2000-105829 A | 4/2000 |
| JP | P2000-132688 A | 5/2000 |
| JP | P2000-235648 A | 8/2000 |
| JP | 2001-167110 A | 6/2001 |
| JP | P2001-216515 A | 8/2001 |
| JP | P2002-183731 A | 6/2002 |
| JP | P2003-030667 A | 1/2003 |
| JP | 3469031 B2 | 11/2003 |
| JP | 2006-277291 A | 10/2006 |
| JP | 2010-079519 A | 4/2010 |
| JP | P2010-251999 A | 11/2010 |
| JP | P2010-273144 A | 12/2010 |
| JP | P2011-516966 A | 5/2011 |

* cited by examiner

FIG. 10

| DICTIONARY ID | FACE FEATURE AMOUNT GROUP |
|---|---|
| No. 1 | ▨ ▨ ▨ |
| No. 2 | ▨ ▨ ▨ ▨ ~1003 |
| No. 3 | ▨ |
| No. 4 | ▨ ▨ |
| No. 5 | ▨ ▨ |
| No. 6 | ▨ ▨ ▨ |
| ⋮ | ⋮ |
|   |   |

FIG. 33A

```
<?xml version="1.0" encoding="utf-8"? >
<IMAGEINFO>
        <BaseInfo>
                <ID>0x00000001</ID>
                <ImagePath>C:¥My Picture¥IMG0001.jpg</ImagePath>
                <ImageSize width=3000, height=2000 />
                <CaptureDateTime>20100101:120000<CaptureDateTime>
        </BaseInfo>
        <SensInfo>
                <AveY>122</AveY>
                <AveS>38</AveS>
                <AveH>50</AveH>
                <SceneType>Landscape</SceneType>
                <Person>
                        <ID>0</ID>
                        <Position>
                                <LeftTop x=420, y=200/>
                                <LeftBottom x=420, y=300/>
                                <RightTop x=520, y=200/>
                                <RightBottom x=520, y=300/>
                        </Position>
                        <AveY>128</AveY>
                        <AveCb>-20</AveCb>
                        <AveCr>20</AveCr>
                </Person>
                . . .
        </SensInfo>
        <UserInfo>
                <FavoriteRate>3</FavoriteRate>
                <ViewingTimes>5</ViewingTimes>
                <PrintingTimes>3</PrintingTimes>
                <Event>Travel</Event>

</UserInfo>
        . . .
</IMAGEINFO>
```

FIG. 33B

```xml
<?xml version="1.0" encoding="utf-8" ?>
<PERSONINFO>
        <ID>0</ID>
        <Name>father</Name>
        <Birthday>19700101</Birthday>
        <Relationship>father</Relationship>
</PERSONINFO>
<PERSONINFO>
        <ID>1</ID>
        <Name>son</Name>
        <Birthday>20000101</Birthday>
        <Relationship>son</Relationship>
</PERSONINFO>

```xml
<?xml version="1.0" encoding="utf-8" ?>
<LayoutInfo>
        <BASIC>
                <Theme></Theme>
                <PageSize>A4</PageSize>
                <Resolution>300</Resolution>
        </BASIC>
        <ImageSlot>
                <ID>0</ID>
                <POSITION>
                        <LeftTop x=100, y=200/>
                        <LeftBottom x=100, y=800/>
                        <RightTop x=1000, y=200/>
                        <RightBottom x=1000, y=800/>
                </POSITION>
                <Shape>Rectangle</Shape>
                <PersonGroup>MainGroup</PersonGroup>
        </ImageSlot>
        <ImageSlot>
                <ID>1</ID>
                <POSITION>
                        <LeftTop x=800, y=700/>
                        <LeftBottom x=800, y=1500/>
                        <RightTop x=1700, y=700/>
                        <RightBottom x=1700, y=1500/>
                </POSITION>
                <Shape>Rectangle</Shape>
                <PersonGroup>MainGroup</PersonGroup>
        </ImageSlot>
        <ImageSlot>
                <ID>2</ID>
                <POSITION>
                        <LeftTop x=300, y=1700/>
                        <LeftBottom x=300, y=2300/>
                        <RightTop x=1200, y=1700/>
                        <RightBottom x=1200, y=2300/>
                </POSITION>
                <Shape>Rectangle</Shape>
                <PersonGroup>MainGroup</PersonGroup>
        </ImageSlot>
</LayoutInfo>
```

FIG. 35

```xml
<?xml version="1.0" encoding="utf-8" ?>
<LayoutInfo>
        <BASIC>
                <Theme></Theme>
                <PageSize>A4</PageSize>
                <Resolution>300</Resolution>
        </BASIC>
        <ImageSlot>
                <ID>0</ID>
                <POSITION>
                        <LeftTop x=400, y=900/>
                        <LeftBottom x=400, y=1500/>
                        <RightTop x=1300, y=900/>
                        <RightBottom x=1300, y=1500/>
                </POSITION>
                <Shape>Rectangle</Shape>
                <PersonGroup>SubGroup</PersonGroup>
        </ImageSlot>
        <ImageSlot>
                <ID>1</ID>
                <POSITION>
                        <LeftTop x=700, y=100/>
                        <LeftBottom x=700, y=500/>
                        <RightTop x=1100, y=100/>
                        <RightBottom x=1100, y=500/>
                </POSITION>
                <Shape>ellipse</Shape>
                <PersonGroup>MainGroup</PersonGroup>
        </ImageSlot>
        <ImageSlot>
                <ID>2</ID>
                <POSITION>
                        <LeftTop x=1100, y=200/>
                        <LeftBottom x=1100, y=600/>
                        <RightTop x=1450, y=200/>
                        <RightBottom x=1450, y=600/>
                </POSITION>
                <Shape>ellipse</Shape>
                <PersonGroup>MainGroup</PersonGroup>
        </ImageSlot>

. . . . . . . .

</LayoutInfo>
```

FIG. 36

```xml
<?xml version="1.0" encoding="utf-8" ?>
<LayoutInfo>
        <BASIC>
                <Theme>growth</Theme>
                <PageSize>A4</PageSize>
                <Resolution>300</Resolution>
                <MainGroup>son</MainGroup>
                <SubGroup>son, father</SubGroup>
        </BASIC>
        <ImageSlot>
                <ID>0</ID>
                <POSITION>
                        <LeftTop x=400, y=900/>
                        <LeftBottom x=400, y=1500/>
                        <RightTop x=1300, y=900/>
                        <RightBottom x=1300, y=1500/>
                </POSITION>
                <Shape>Rectangle</Shape>
                <PersonGroup>SubGroup</PersonGroup>
        </ImageSlot>
        <ImageSlot>
                <ID>1</ID>
                <POSITION>
                        <LeftTop x=700, y=100/>
                        <LeftBottom x=700, y=500/>
                        <RightTop x=1100, y=100/>
                        <RightBottom x=1100, y=500/>
                </POSITION>
                <Shape>ellipse</Shape>
                <PersonGroup>MainGroup</PersonGroup>
        </ImageSlot>
        <ImageSlot>
                <ID>2</ID>
                <POSITION>
                        <LeftTop x=1100, y=200/>
                        <LeftBottom x=1100, y=600/>
                        <RightTop x=1450, y=200/>
                        <RightBottom x=1450, y=600/>
                </POSITION>
                <Shape>ellipse</Shape>
                <PersonGroup>MainGroup</PersonGroup>
        </ImageSlot>
          . . . . . . .
</LayoutInfo>
```

FIG. 37

```xml
<?xml version="1.0" encoding="utf-8" ?>
<LayoutInfo>
        <BASIC>
                <Theme>travel</Theme>
                <PageSize>A4</PageSize>
                <Resolution>300</Resolution>
                <MainGroup>son, mother, father</MainGroup>
        </BASIC>
        <ImageSlot>
                <ID>0</ID>
                <POSITION>
                        <LeftTop x=100, y=200/>
                        <LeftBottom x=100, y=800/>
                        <RightTop x=1000, y=200/>
                        <RightBottom x=1000, y=800/>
                </POSITION>
                <Shape>Rectangle</Shape>
                <PersonGroup>MainGroup</PersonGroup>
        </ImageSlot>
        <ImageSlot>
                <ID>1</ID>
                <POSITION>
                        <LeftTop x=800, y=700/>
                        <LeftBottom x=800, y=1500/>
                        <RightTop x=1700, y=700/>
                        <RightBottom x=1700, y=1500/>
                </POSITION>
                <Shape>Rectangle</Shape>
                <PersonGroup>MainGroup</PersonGroup>
        </ImageSlot>
        <ImageSlot>
                <ID>2</ID>
                <POSITION>
                        <LeftTop x=300, y=1700/>
                        <LeftBottom x=300, y=2300/>
                        <RightTop x=1200, y=1700/>
                        <RightBottom x=1200, y=2300/>
                </POSITION>
                <Shape>Rectangle</Shape>
                <PersonGroup>MainGroup</PersonGroup>
        </ImageSlot>
</LayoutInfo>
```

FIG. 38

```xml
<?xml version="1.0" encoding="utf-8" ?>
<LayoutInfo>
        <BASIC>
                <Theme>growth</Theme>
                <PageSize>A4</PageSize>
                <Resolution>300</Resolution>
                <MainGroup>son</MainGroup>
                <SubGroup>son, father</SubGroup>
        </BASIC>
        <ImageSlot>
                <ID>0</ID>
                <POSITION>
                        <LeftTop x=400, y=900/>
                        <LeftBottom x=400, y=1500/>
                        <RightTop x=1300, y=900/>
                        <RightBottom x=1300, y=1500/>
                </POSITION>
                <Shape>Rectangle</Shape>
                <PersonGroup>SubGroup</PersonGroup>
                <ImageID>0x00000001</ImageID>
                <TrimmingRatio>50.0</TrimmingRatio>
        </ImageSlot>
        <ImageSlot>
                <ID>1</ID>
                <POSITION>
                        <LeftTop x=700, y=100/>
                        <LeftBottom x=700, y=500/>
                        <RightTop x=1100, y=100/>
                        <RightBottom x=1100, y=500/>
                </POSITION>
                <Shape>ellipse</Shape>
                <PersonGroup>MainGroup</PersonGroup>
                <ImageID>0x00000089</ImageID>
                <TrimmingRatio>38.0</TrimmingRatio>
        <ImageSlot>
                <ID>2</ID>
                <POSITION>
                        <LeftTop x=1100, y=200/>
                        <LeftBottom x=1100, y=600/>
                        <RightTop x=1450, y=200/>
                        <RightBottom x=1450, y=600/>
                </POSITION>
                <Shape>ellipse</Shape>
                <PersonGroup>MainGroup</PersonGroup>
                <ImageID>0x00000129</ImageID>
                <TrimmingRatio>53.0</TrimmingRatio>
        </ImageSlot>
         . . . . . . .
</LayoutInfo>
```

APPARATUS AND METHOD FOR MANAGING AN OBJECT EXTRACTED FROM IMAGE DATA

BACKGROUND OF THE INVENTION

Field of the Invention

The present invention relates to an apparatus and a method for managing an object extracted from image data.

Description of the Related Art

As digital still cameras (hereinafter, also referred to as DSCs) and multifunctional mobile phones having a camera function become widespread, the number of digital pictures captured by a user is increasing dramatically. Such data is usually stored in a personal computer (PC) the user owns and/or by using storage services provided on the Internet. As the number of stored pictures increases, there arises a problem that a lot of image viewing operations are needed to find out where desired images are stored. In view of such a problem, a method for detecting faces of persons from a large amount of image data stored by a user, performing a face feature amount analysis on face areas, and automatically grouping the faces of persons who are considered to be the same persons has been discussed (Japanese Patent Application Laid-Open (Translation of PCT Application) No. 2011-516966)).

In the case of automatically grouping the faces of persons considered to be the same persons like Japanese Patent Application Laid-Open (Translation of PCT Application) No. 2011-516966, a challenge has been to improve the accuracy of grouping, or equivalently, the accuracy of individual recognition.

The foregoing Japanese Patent Application Laid-Open (Translation of PCT Application) No. 2011-516966 discusses providing a unit that displays a warning mark on face information considered likely to have caused misrecognition in a displayed person group, and from which the user inputs whether to accept or reject the face. If the user rejects the face, the face information is hidden from a user interface (UI). However, if new face information similar to the face information considered likely to have caused misrecognition is input during grouping processing, a warning mark appears again.

SUMMARY OF THE INVENTION

The present invention is directed to an apparatus and a method of improved individual recognition accuracy.

According to an aspect of the present invention, an apparatus includes a first management unit configured to classify and manage feature information of a plurality of objects extracted from image data in units of similar feature information, a second management unit configured to classify and manage the plurality of objects extracted from the image data object by object, an association unit configured to associate classifications of the objects by the second management unit with classifications of the feature information by the first management unit, and an input unit configured to input a correction instruction about the classifications of the objects by the second management unit, wherein the association unit is configured to, if the correction instruction is input by the input unit, update an association between the classifications of the objects and the classifications of the feature information and the second management unit is configured to correct and manage the classifications of the objects based on updating of the association by the association unit.

Further features of the present invention will become apparent from the following description of exemplary embodiments with reference to the attached drawings.

BRIEF DESCRIPTION OF THE DRAWINGS

FIG. 10 illustrates an example of face feature amounts in a face dictionary according to the first exemplary embodiment.

FIGS. 33A and 33B illustrate examples of formats in which an image analysis result and person attributes are stored.

FIG. 34 illustrates an example of a format in which the layout template of FIG. 16 is stored.

FIG. 35 illustrates an example of a format in which the layout template of FIG. 17 is stored.

FIG. 36 illustrates an example of how a determined theme and main character information are stored.

FIG. 37 illustrates an example of how a determined theme and main character information are stored.

FIG. 38 illustrates an example of how generated layout information is stored.

DESCRIPTION OF THE EMBODIMENTS

A first exemplary embodiment of the present invention for automatically generating a layout output product by using input image groups will be described below. The following description will only exemplify a mode of embodiment, and the present invention is not limited to the following exemplary embodiment.

Figure 1:
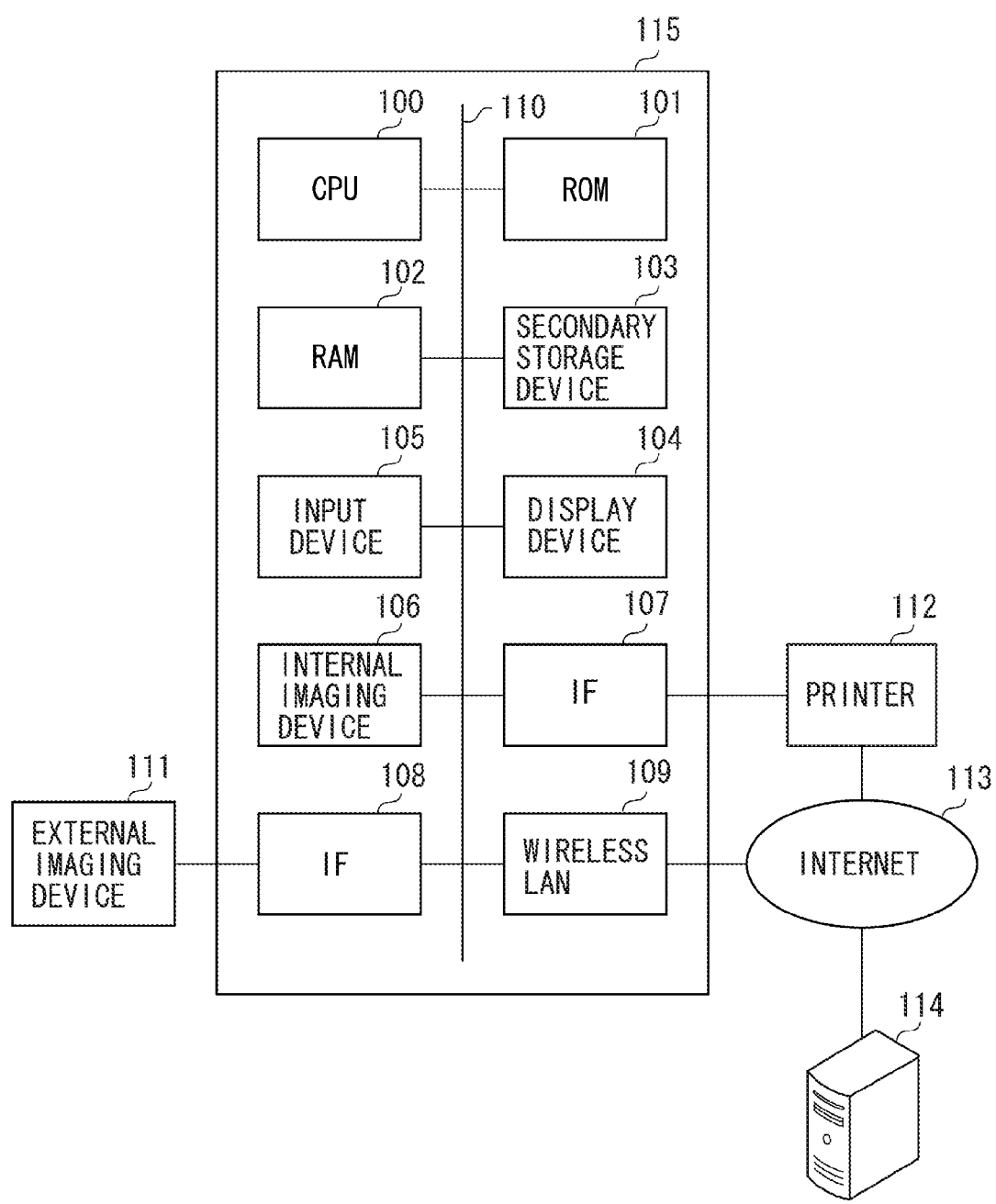
FIG. 1 is a hardware configuration diagram of an image processing apparatus according to a first exemplary embodiment.

FIG. 1 is a block diagram illustrating an example of a hardware configuration of an image processing apparatus according to the first exemplary embodiment.

In FIG. 1, an image processing apparatus 115 includes a central processing unit (CPU) 100, a read-only memory (ROM) 101, a random access memory (RAM) 102, a secondary storage device 103, a display device 104, an input device 105, an interface (IF) 107, an IF 108, and a wireless local area network (LAN) 109. The image processing apparatus 115 further includes an internal imaging device 106. Such components are connected to each other by a control bus/data bus 110.

An example of the image processing apparatus 115 is a computer. The CPU 110 performs information processing described in the first exemplary embodiment according to a program. The ROM 101 stores programs such as an application to be described below which is executed by the CPU 100. The RAM 102 provides a memory for temporarily storing various types of information when the CPU 100 executes a program. The secondary storage device 103 is a hard disk. The secondary storage medium 103 is a storage medium for storing image files and a database which stores image analysis results. An example of the display device 104 is a display. The display device 104 is a device for presenting a result of processing of the first exemplary embodiment and UIs to be described below to the user. The display device 104 may include a touch panel function. The input device 105 includes a mouse and/or a keyboard from which the user inputs an instruction for image correction processing.

Images captured by the internal imaging device 106 are subjected to predetermined image processing before stored into the secondary storage device 103. The image processing apparatus 115 can also read image data from an external imaging device 111 which is connected via an interface (IF 108). The wireless LAN 109 is connected to the Internet 113. The image processing apparatus 115 can also acquire image data from an external server 114 which is connected to the Internet 113.

A printer 112 for outputting images is connected to the image processing apparatus 115 via the IF 107. The printer 112 is further connected to the Internet 113 and can exchange print data with the image processing apparatus 115 via the wireless LAN 109.

Figure 2:
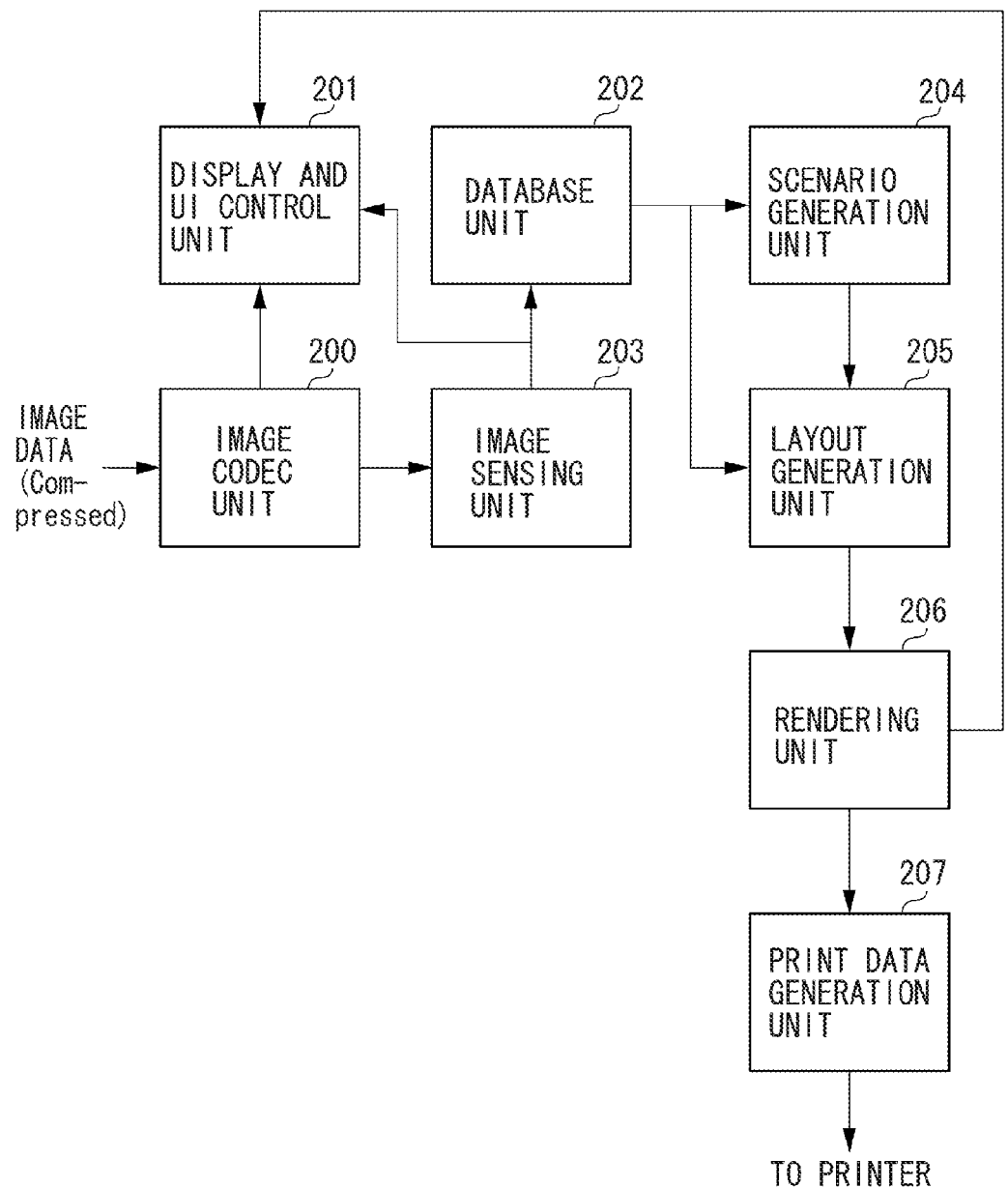
FIG. 2 is a software block diagram according to the first exemplary embodiment.

FIG. 2 is a block diagram illustrating a software configuration of the foregoing application according to the present exemplary embodiment.

Image data acquired by the image processing apparatus 115 is usually in a compression format such as Joint Photography Expert Group (JPEG). An image codec unit 200 decompresses and converts the compression format into a red, green, and blue (RGB) dot sequential bitmap data format. The converted bitmap data is transmitted to a display and UI control unit 201 and displayed on the display device 104 such as a display.

The bitmap data is further input to an image sensing unit 203 (application). As will be described in detail below, the image sensing unit 203 performs various types of analysis processing on images. A database unit 202 stores various types of attribute information about the images, obtained as a result of the analysis processing into the secondary storage device 103 in a predetermined format. In the following description, image analysis processing is synonymous with sensing processing.

A scenario generation unit 204 (application) generates conditions (scenario) of layouts to be automatically generated according to various conditions input by the user. A layout generation unit 205 (application) performs processing for automatically generating layouts according to the scenario.

Based on the generated layouts, a rendering unit 206 generates bitmap data for display. The bitmap data is transmitted to the display and UI control unit 201, and a result is displayed on the display device 104 such as a display. The rendering unit 206 further transmits a rendering result to a print data generation unit 207. The print data generation unit 207 converts the rendering result into printer command data, and transmits the printer command data to the printer 112.

Figure 3:
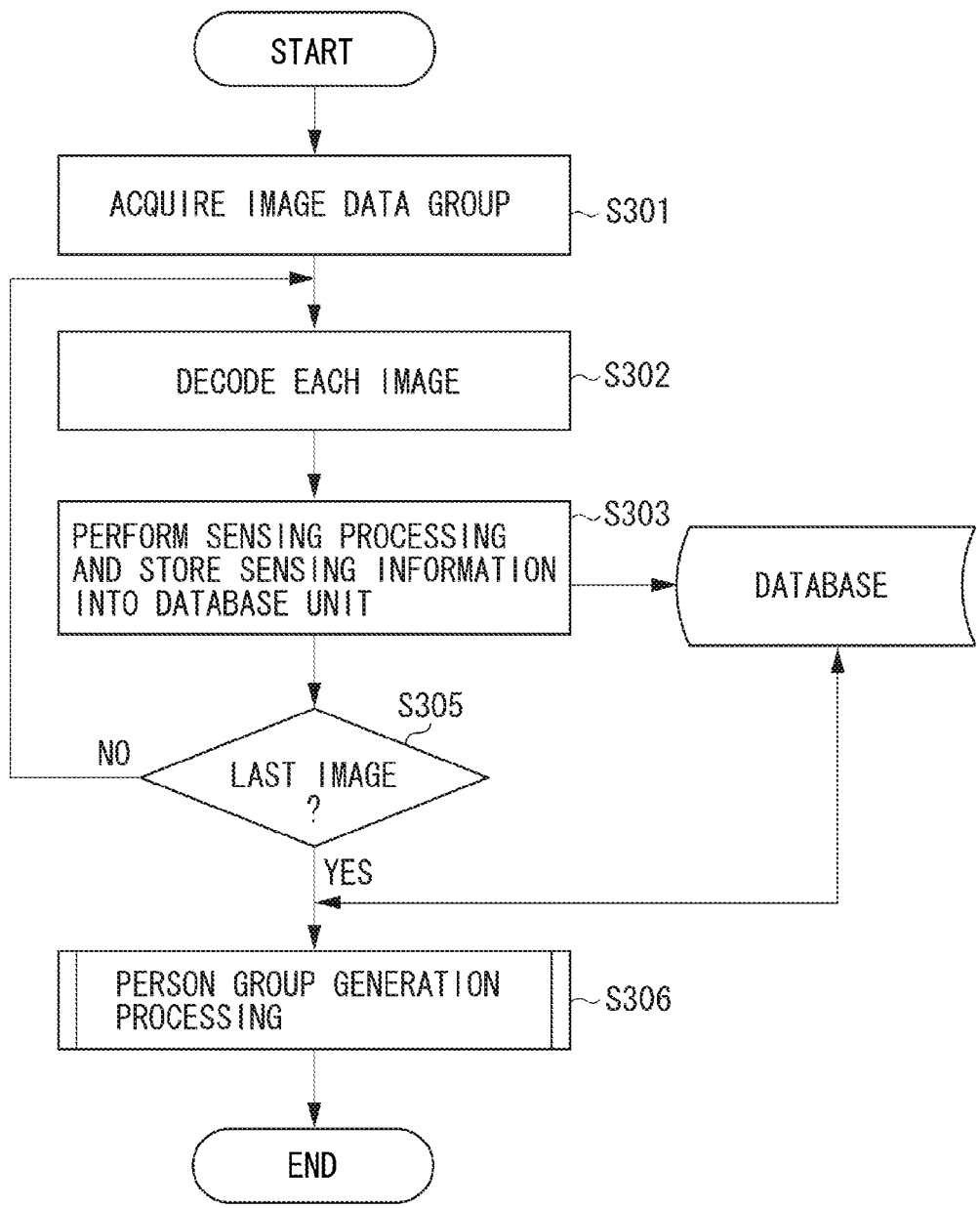
FIG. 3 is a flowchart of image analysis processing according to the first exemplary embodiment.
Figure 4:
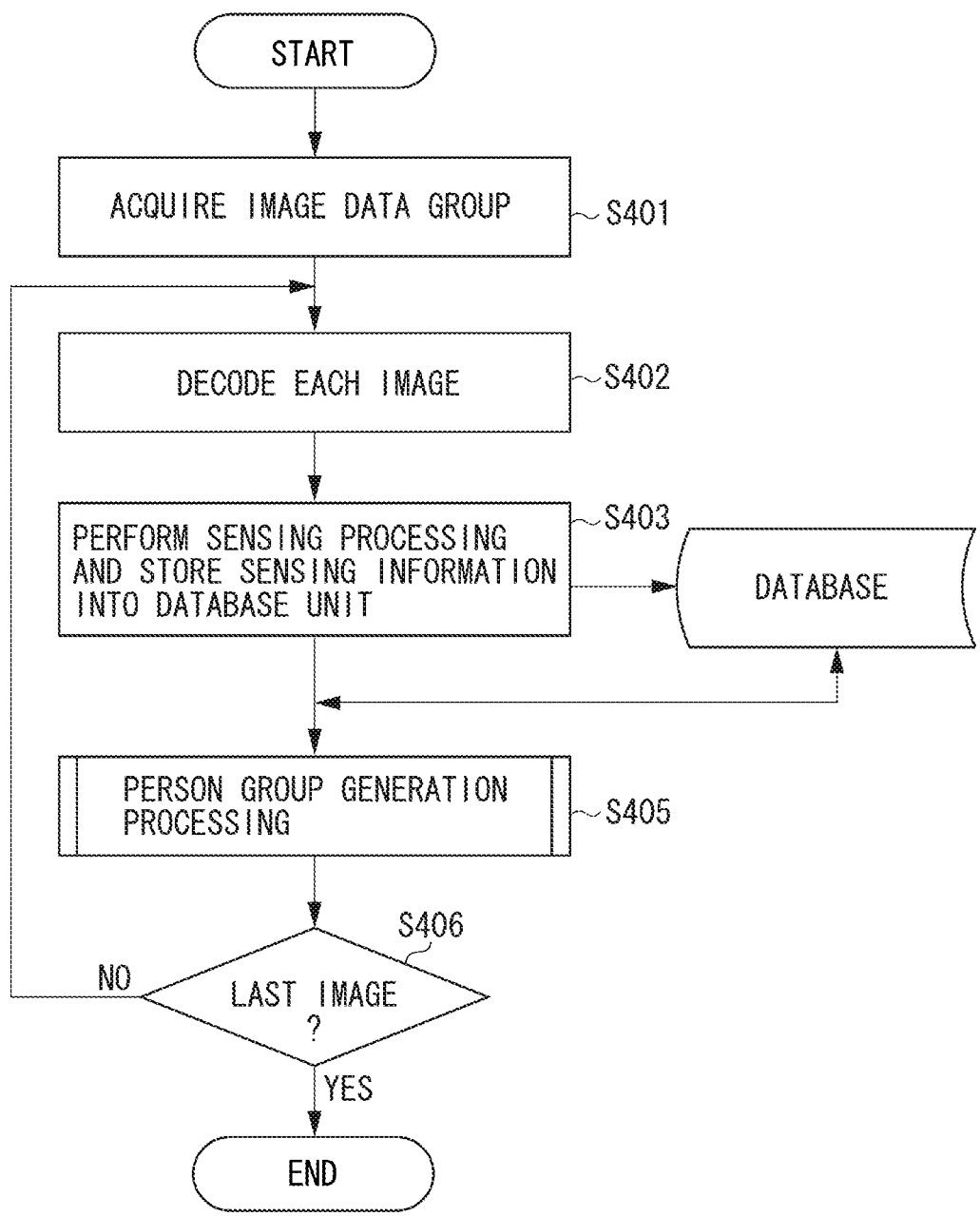
FIG. 4 is a flowchart of alternate image analysis processing according to the first exemplary embodiment.
Figure 5:
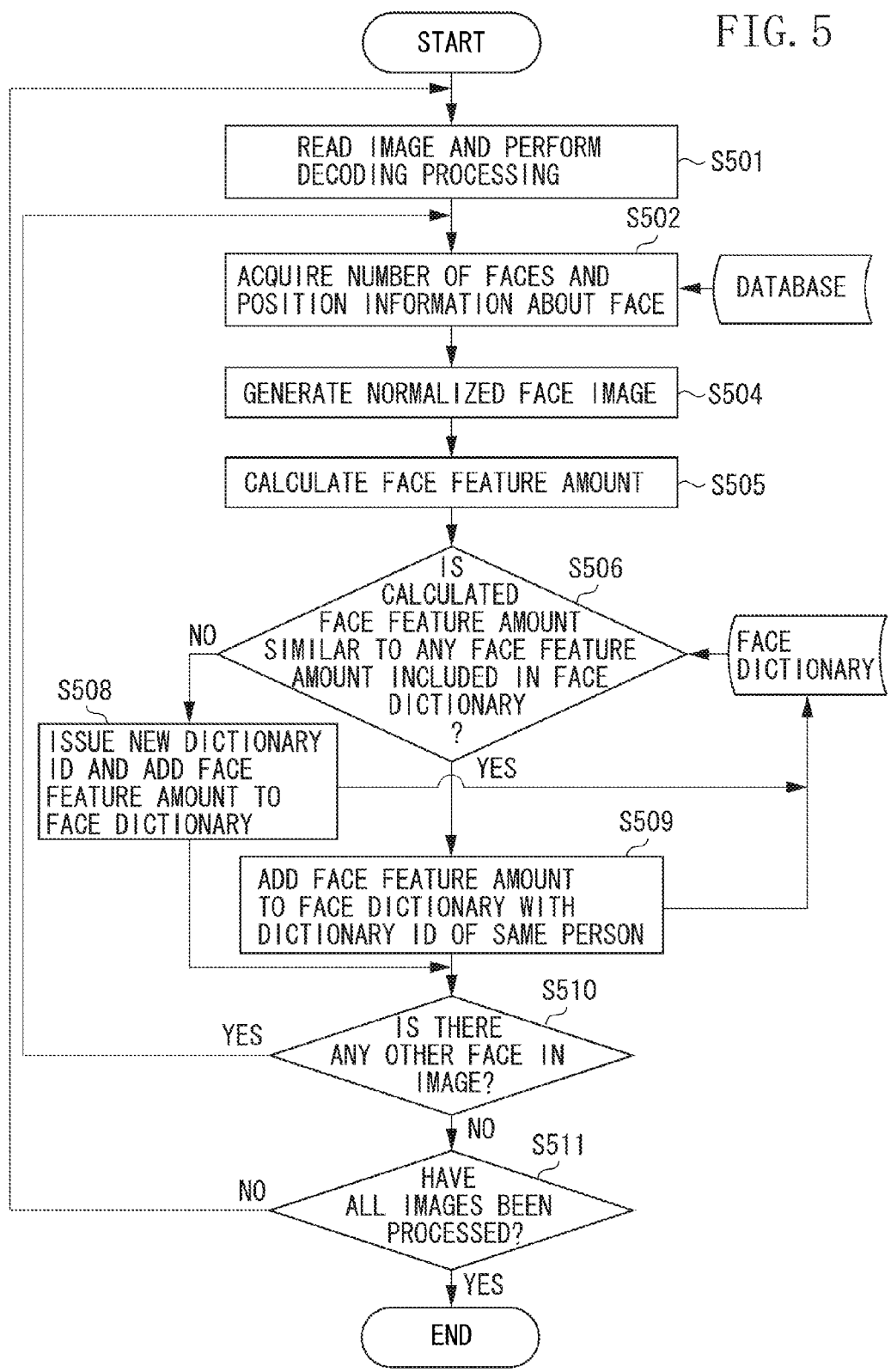
FIG. 5 is a flowchart of person group generation processing according to the first exemplary embodiment.
Figure 6:
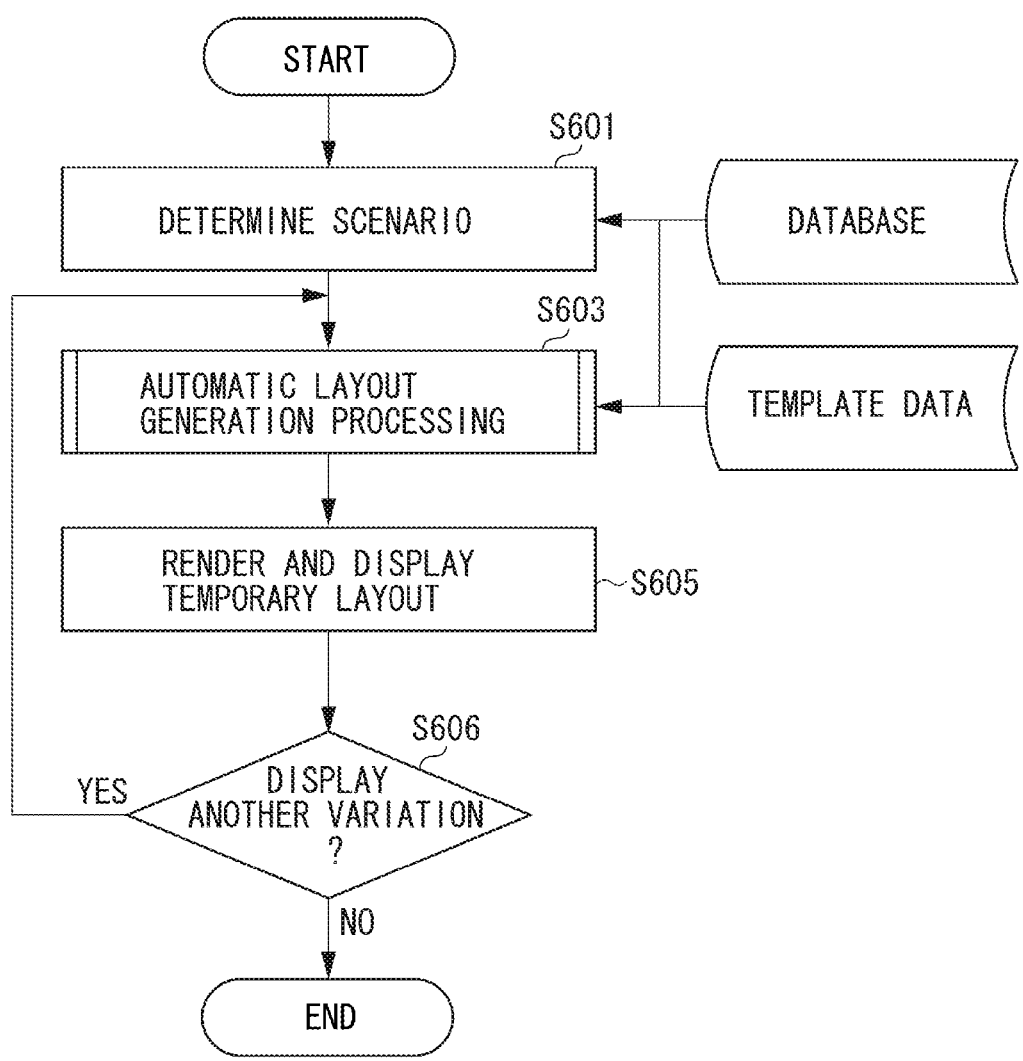
FIG. 6 is a flowchart of automatic layout suggestion processing according to the first exemplary embodiment.

FIGS. 3 to 6 are flowcharts illustrating basic image processing of the application according to the present exemplary embodiment. Specifically, FIGS. 3 and 4 illustrate a flow of the image sensing unit 203, i.e., a processing flow for acquiring a plurality of image data groups, applying analysis processing to each of the image data groups, and storing the result into the database unit 202. FIG. 5 illustrates a processing flow for grouping face information considered to be that of the same persons based on detected face position information. FIG. 6 illustrates a processing flow for determining a scenario for layout generation based on analysis information about images and various types of information input by the user, and automatically generating layouts based on the scenario.

In step S301 of FIG. 3, the image sensing unit 203 acquires an image data group. For example, the user may connect an image capturing apparatus or memory card containing captured images to the image processing apparatus 115, and the image sensing unit 203 may read the captured images from the image capturing apparatus or memory card to acquire an image data group. The image sensing unit 203 may acquire an image data group that has been captured by the internal imaging device 106 and stored in the secondary storage device 103. The image sensing unit 203 may acquire an image data group from a device other than the image processing apparatus 115, like the external server 114 connected to the Internet 113, via the wireless LAN 109.

Figure 8:
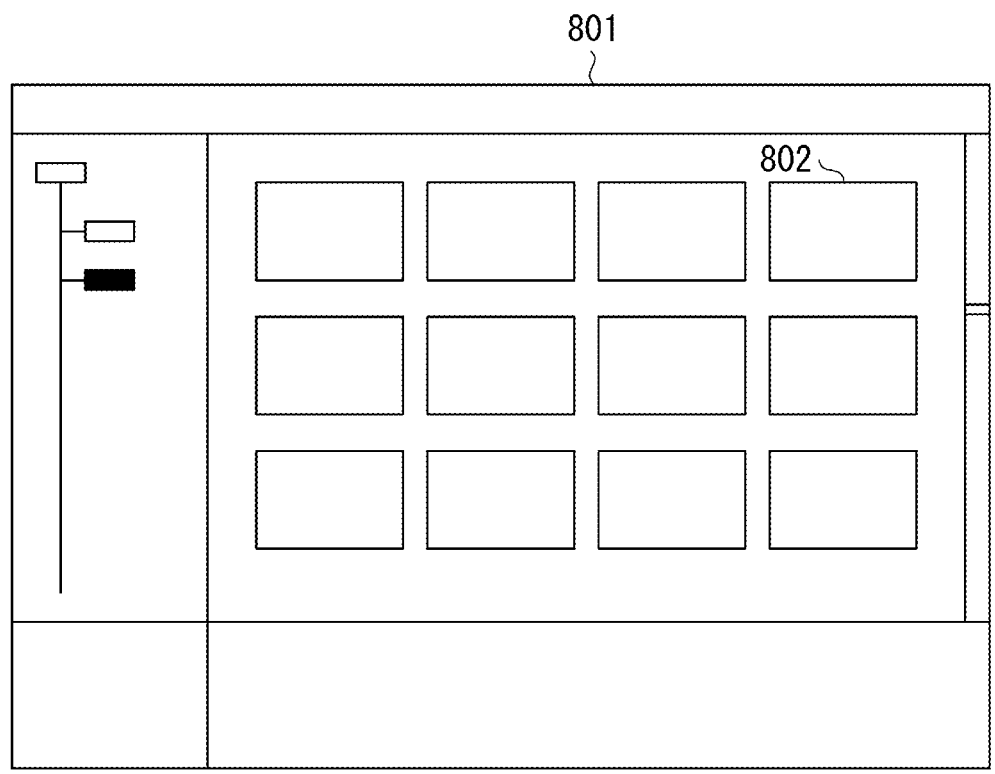
FIG. 8 illustrates a display example of an image group in a thumbnail form of the first exemplary embodiment.
Figure 9:
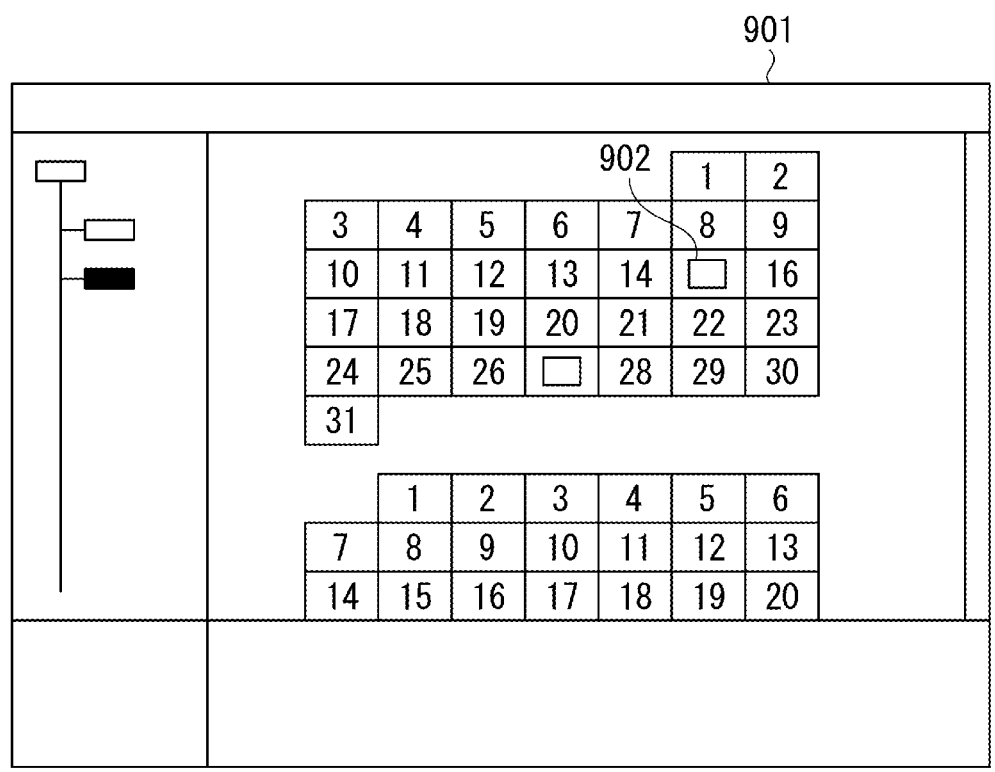
FIG. 9 illustrates a display example of an image group in a calendar form of the first exemplary embodiment.

Acquiring the image data group, the image sensing unit 203 displays a thumbnail group of the image data group on a UI as illustrated in FIGS. 8 and 9. As illustrated in FIG. 8, the image sensing unit 203 may use a UI 801 to display thumbnails 802 of images in units of folders in the secondary storage device 103. As illustrated in FIG. 9, the image sensing unit 203 may use a calendar-like UI 901 to manage image data by date. If the user clicks a date portion 902, the image sensing unit 203 displays images captured on that date in a thumbnail list form as illustrated in FIG. 8.

In step S302, the image sensing unit 203 decodes each image. Specifically, the application searches for a new stored image on which sensing processing has not been performed yet. The image codec unit 200 converts each extracted image from compressed data into bitmap data.

In step S303, the image sensing unit 203 performs various types of sensing processing on the bitmap data. As employed herein, the sensing processing includes various types of processing listed in the following Table 1. In the present exemplary embodiment, examples of the sensing processing include face detection, a feature amount analysis of an image, and a scene analysis. Table 1 shows data types of respective calculation results.

TABLE 1

Examples of Attribute Information Obtained as a Result of Image Analysis

| Sensing category | Sensing subcategory | Data type | Value |
|---|---|---|---|
| Image basic feature amount | Average luminance | int | 0 to 255 |
| | Average saturation | int | 0 to 255 |
| | Average hue | int | 0 to 359 |
| Face detection | Number of human faces | int | 0 to MAXFACE |
| | Coordinate positions | int * 8 | 0 to Width or Height |
| | Average Y in face area | int | 0 to 255 |
| | Average Cb face area | int | −128 to 127 |
| | Average Cr face area | int | −128 to 127 |
| Scene analysis | Scene result | char | Landscape Nightscape Portrait Underexposure Others |

Each type of sensing processing will be described below.

An overall average luminance and average saturation are basic feature information of an image such as basic feature amounts of an image, and can be determined by a known method. A detailed description thereof will thus be omitted. An average luminance can be determined by converting R, G, and B components of each pixel of an image into known luminance and color difference components (for example, Y, Cb, and Cr components; conversion equations are omitted) and averaging the Y components. An average saturation may be determined by calculating the following S of the Cb and Cr components of each pixel and averaging the calculations:

$$S=\sqrt{Cb^2+Cr^2} \qquad \text{Eq. 1}$$

An average hue (AveH) in an image is a feature amount for evaluating a color tone of the image. The hue of each pixel can be determined by using known hue, intensity, and saturation (HIS) conversion equations. The hues of the entire image can be averaged to determine AveH.

The image sensing unit 203 may calculate such feature amounts of the entire image as described above. The image sensing unit 203 may divide an image into areas of predetermined size, and calculate the feature amounts of each area.

Next, human face detection processing will be described. In the present exemplary embodiment, the image sensing unit 203 may use, for example, a known technique for human face detection.

Japanese Patent Application Laid-Open No. 2002-183731 discusses a method that includes detecting an eye area from an input image and assuming a periphery of the eye area as a face candidate area. In the face candidate area, luminance gradients and weights of the luminance gradients are calculated pixel by pixel. The resulting values are compared with gradients and weights of the gradients of an ideal face reference image which is set in advance. If an average angle between the gradients is smaller than or equal to a predetermined threshold, the input image is determined to include a face area.

A method discussed in Japanese Patent Application Laid-Open No. 2003-30667 includes initially detecting a skin color area in an image, and detecting pixels of human iris color in the skin color area to detect eye positions.

A method discussed in Japanese Patent Application Laid-Open No. 8-63597 includes initially calculating matching rates between a plurality of face-shaped templates and an image. A template having the highest matching rate is selected. If the highest matching rate is higher than or equal to a predetermined threshold, the area inside the selected template is set as a face candidate area. The same template can be used to detect eye positions.

In a method discussed in Japanese Patent Application Laid-Open No. 2000-105829, an entire image or a designated area in the image is scanned by using a nose image pattern as a template, and a closest matching position is output as a nose position. Assuming an area above the nose position in the image as an area where eyes exist, the eye-existing area is scanned for matching by using an eye image pattern as a template. This determines an eye existence candidate position set which is a set of pixels where the matching rate is higher than a threshold. Continuous areas included in the eye existence candidate position set are divided into clusters. Distances between the respective clusters and the nose position are calculated. A cluster that minimizes the distance is determined to be a cluster where eyes exist, whereby organ positions can be detected.

Other examples of human face detection methods may include methods for detecting a face or organ position or positions discussed in Japanese Patent Application Laid-Open No. 8-77334, Japanese Patent Application Laid-Open No. 2001-216515, Japanese Patent Application Laid-Open No. 5-197793, Japanese Patent Application Laid-Open No. 11-53525, Japanese Patent Application Laid-Open No. 2000-132688, Japanese Patent Application Laid-Open No. 2000-235648, and Japanese Patent Application Laid-Open No. 11-250267. The human face detection processing may also be performed by a method discussed in Japanese Patent No. 2541688. The human face detection processing is not limited to any particular method.

By the human face detection processing, the image sensing unit 203 can acquire the number of human faces and the coordinate positions of the faces from each input image. Once the coordinate positions of the faces are known, the image sensing unit 203 can analyze the feature amounts of face areas. For example, the image sensing unit 203 can determine average Y, Cb, and Cr values of pixels included in the face areas to acquire the average luminance and average color difference of each face area one by one.

The image sensing unit 203 can also perform scene analysis processing by using feature amounts of an image. For example, the image sensing unit 203 can perform scene analysis processing by using methods discussed in Japanese Patent Application Laid-Open No. 2010-251999 and Japanese Patent Application Laid-Open No. 2010-273144. By the scene analysis processing, the image sensing unit 203 can acquire identifiers (IDs) for identifying captured scenes, including landscape, nightscape, person (portrait), underexposure, and others.

In the present exemplary embodiment, the image sensing unit 203 acquires sensing information by the foregoing sensing processing. However, the image sensing unit 203 may use different sensing information.

The image sensing unit 203 stores the sensing information acquired as described above into the database unit 202. As for a storage format of the database unit 202, the image sensing unit 203 may describe and store the sensing information in a general-purpose format as illustrated in FIG. 33A (for example, extensible markup language (XML)).

FIG. 33A illustrates an example where attribute information about each image is described in three separate categories.

The first, BaseInfo tag is intended to store information attached to an acquired image file in advance, like an image size and photographing time information. Examples of such information include an identifier ID of each image, a storage location where the image file is stored, an image size, and photographing date and time.

The second, SensInfo tag is intended to store results of the foregoing image analysis processing. An average luminance, an average saturation, and an average hue of the entire image, and a result of scene analysis are stored. Information about face positions and face color of persons in the image and also stored.

The third, UserInfo tag is a tag that can store information the user has input image by image. The UserInfo tag will be described in detail below.

The method for storing the image attribute information into the database unit 202 is not limited to the foregoing. Such information may be stored in any other format.

In step S305 of FIG. 3, the image sensing unit 203 determines whether the image on which the foregoing processing of steps S302 and S303 has been performed is the last one. If the image is the last one (YES in step S305), the image sensing unit 203 proceeds to step S306. If the image is not the last one (NO in step S305), the image sensing unit 203 returns to step S302.

In step S306, the image sensing unit 203 performs processing for generating groups person by person by using face position information detected in step S303. Automatically grouping human faces in advance can make the user's subsequent operation for naming persons more efficient.

Here, the image sensing unit 203 generates person groups, for example, by using a known individual recognition method according to the processing flow of FIG. 5.

Note that individual recognition processing is mostly performed by extracting feature amounts of facial organs such as eyes and a mouth, and comparing degrees of similarity of relationship between such feature amounts. An example of the individual recognition processing is discussed in Japanese Patent No. 3469031. A detailed description thereof will thus be omitted.

FIG. 5 is a basic flowchart of person group generation processing in step S306.

In step S501, the image sensing unit 203 reads an image stored in the secondary storage device 103 in order and performs decoding processing. In step S502, the image sensing unit 203 accesses the database unit 202 to acquire the number of faces included in the image and position information about a face. In step S504, the image sensing unit 203 generates a normalized face image for performing the individual recognition processing.

An image may include faces of various sizes, orientations, and resolutions. Normalized face images refer to face images that are transformed and cut out to a predetermined size and orientation. For the purpose of individual recognition, the positions of organs such as eyes and a mouth are important. Normalized face images therefore desirably have a size such that the foregoing organs can be reliably recognized. The generation of such normalized face images eliminates the need to handle faces of various resolutions during feature amount detection processing.

In step S505, the image sensing unit 203 calculates a face feature information such as a face feature amount from the normalized face image. As employed herein, a face feature amount characteristically includes the positions and sizes of organs such as eyes, a mouth, and a nose, and the outline of the face.

In step S506, the image sensing unit 203 determines whether the calculated face feature amount is similar to face feature amounts stored in a database (hereinafter, referred to as a face dictionary) in which face feature amounts are stored with respect to each person's identifier (dictionary ID) in advance. For example, the image sensing unit 203 compares a feature amount managed in the face dictionary with the new input feature amount to calculate a degree of similarity. The feature amounts to be used here include stored information about the positions of organs such as eyes, a nose, and a mouth, and distances between the organs. The more similar the foregoing feature amounts are, the higher the value of the degree of similarity is. The less similar, the lower the value the degree of similarity. For example, possible values of the degree of similarity are 0 to 100. The image sensing unit 203 determines whether the face feature amounts are similar by comparing the calculated degree of similarity with a threshold retained in advance. If the degree of similarity is higher than the threshold (YES in step S506), the image sensing unit 203 determines that the person is the same person as the one having the dictionary ID. If the degree of similarity is lower than or equal to the threshold (NO in step S506), the image sensing unit 203 determines that the person is not the same person. One fixed threshold for such a similarity degree determination may be retained for all the dictionary IDs. Different thresholds may be retained for respective dictionary IDs.

If YES in step S506, the image sensing unit 203 proceeds to step S509. In step S509, determining that the person is the same person, the image sensing unit 203 adds the face feature amount to the face dictionary with the dictionary ID of the same person.

If NO in step S506, the image sensing unit 203 proceeds to step S508. In step S508, determining that the face under evaluation is of a person different from those who have been registered in the face dictionary, the image sensing unit 203 issues a new dictionary ID and adds the face feature amount to the face dictionary. The image sensing unit 203 applies the processing of steps S502 to S509 to all face areas detected from the input image group, thereby grouping persons who have appeared.

The image sensing unit 203 writes the result of the person group generation processing face by face by using ID tags as illustrated by an XML format of FIG. 33B, and stores the resultant into the database.

FIG. 10 illustrates the contents of the face dictionary generated by the person group generation processing. In FIG. 10, each face feature amount group 1002 includes a face feature amount or amounts 1003 which represent respective separate face feature amounts registered in the face dictionary. Face feature amounts 1003 managed by the same dictionary ID 1001 are those of faces that are determined to be of the same person.

In the exemplary embodiment described above, the image sensing unit 203 performs the person group generation processing after the end of the sensing processing of all the images as illustrated in FIG. 3. However, other methods may be employed. For example, as illustrated in FIG. 4, the image sensing unit 203 may repeat performing the sensing processing on an image in step S403 and then performing the person group generation processing in step S405 by using face detection position information. This can produce the same result.

Figure 7:
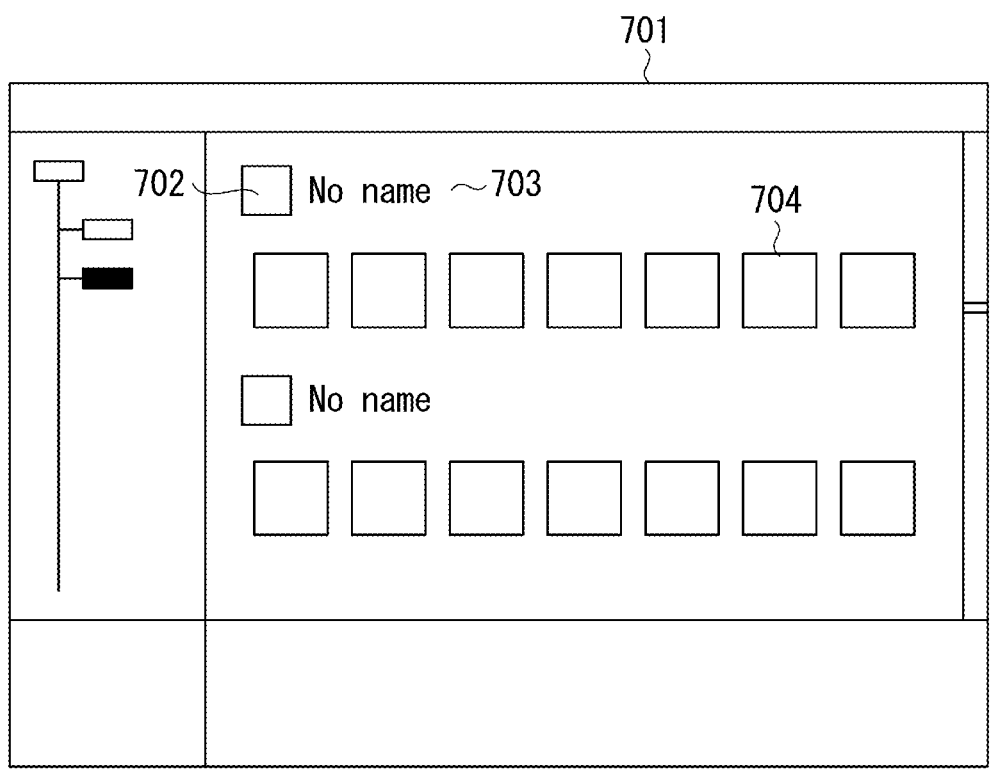
FIG. 7 illustrates a display example of person groups of the first exemplary embodiment.

FIG. 7 illustrates an example of a UI 701 which displays the person groups obtained by the person group generation processing. In FIG. 7, a representative face image 702 of a person group is displayed next to an area 703 where a name of the person group is displayed. Immediately after the end of automatic person group generation processing, person names such as "No name1" and "No name2" are displayed as illustrated in FIG. 7. Hereinafter, such person names will be referred to as person IDs. A plurality of face images 704 is included in the person group. As will be described below, the UI 701 of FIG. 7 enables the user to designate an area 703 of "No name" and input a person name, and/or input information such as a birthday and relationship person by person.

Figure 12:
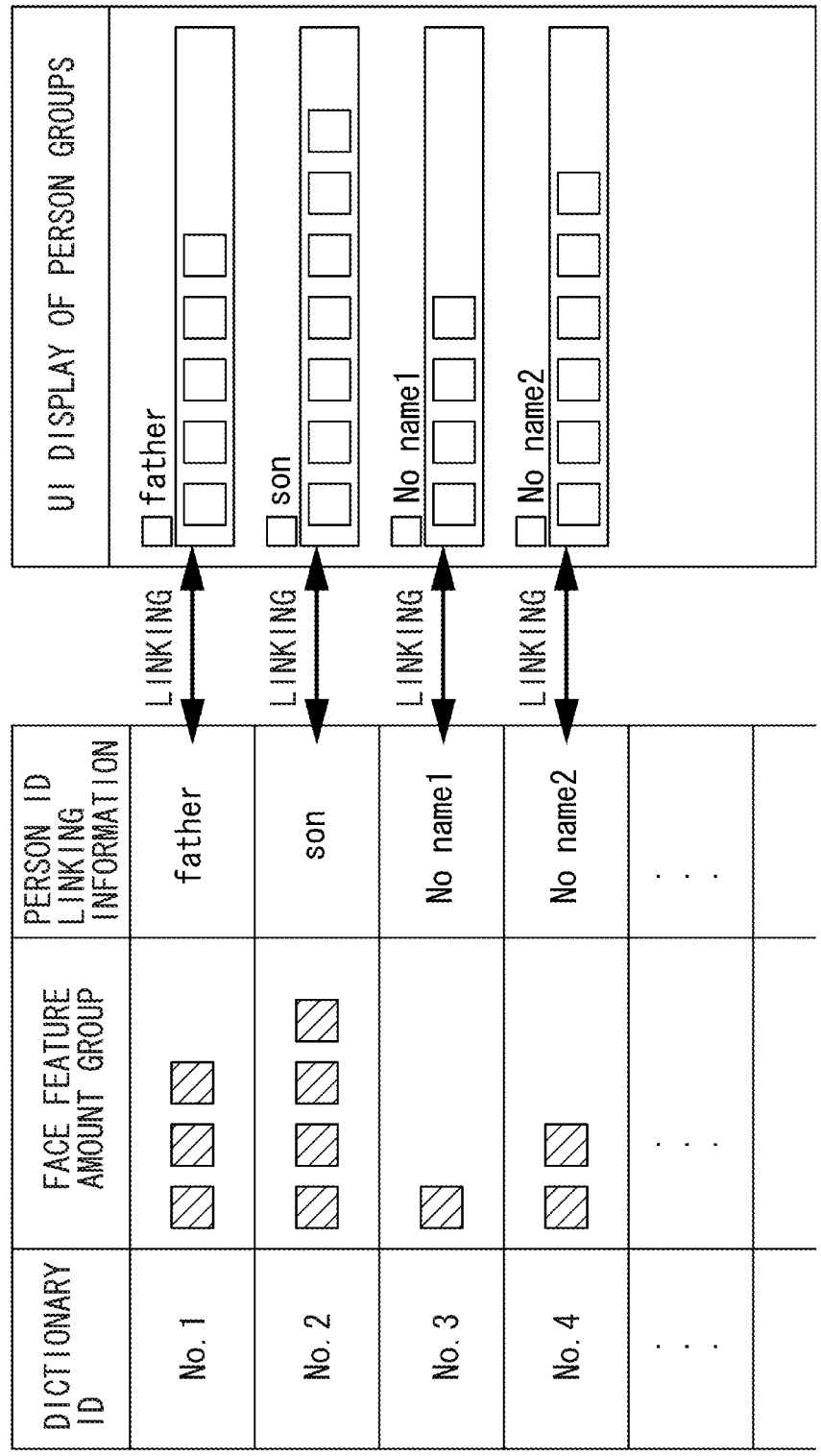
FIG. 12 illustrates contents of the face dictionary and a display example of person groups according to the first exemplary embodiment.

As illustrated in FIG. 12, the dictionary IDs and the person IDs are managed in association with (as linked with) each other.

The image sensing unit 203 may perform the foregoing sensing processing by utilizing a background task of an operating system. In such a case, the image sensing unit 203 can continue the sensing processing of an image group or groups while the user performs other operations on the computer.

In the present exemplary embodiment, the user can manually input various types of attribute information about images.

Table 2 lists examples of such attribute information. Attribute information about images is broadly classified into two categories: information to be set for each image and information to be set for each person grouped by the person group generation processing.

TABLE 2

| Category | Item | Data type | Value |
|---|---|---|---|
| Image | Satisfaction rating | int | 0 to 5 |
|  | Event | char | "travel" "graduation" "wedding" |
| Person | Name | char | "NAME" |
|  | Birthday | char | YYYYMMDD |
|  | Relationship | char | "family" "" |

Figure 13:
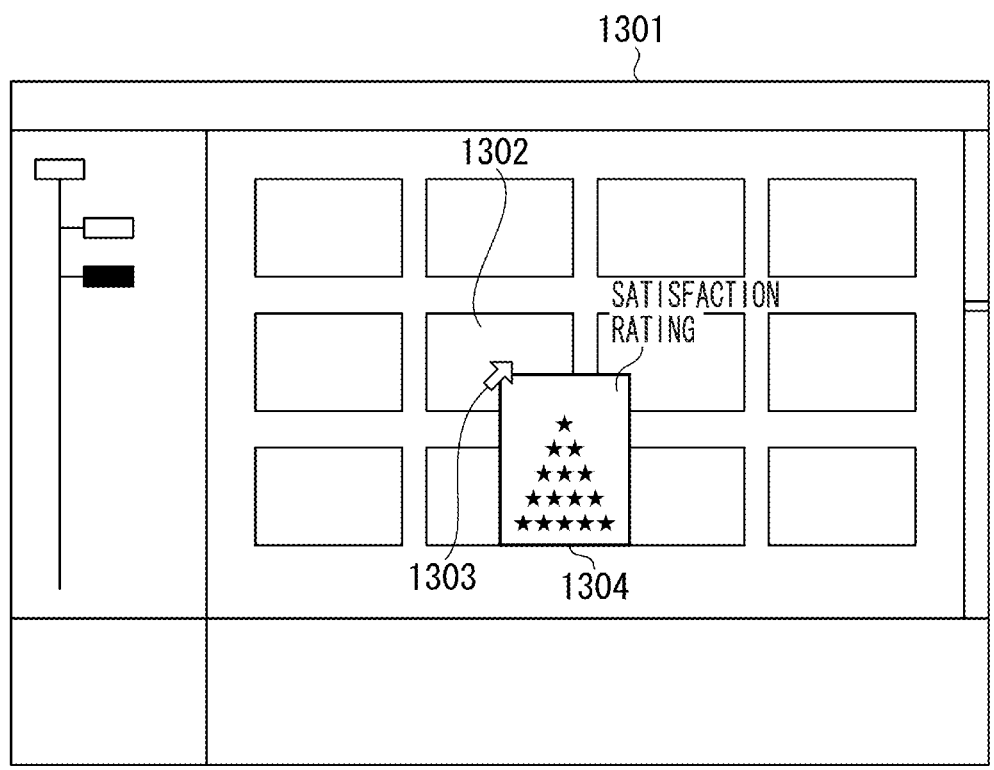
FIG. 13 illustrates an example UI for manually inputting a satisfaction rating.

An example of the attribute information set image by image is the user's satisfaction rating. The satisfaction rating enables the user to manually input whether he/she likes the image in a stepwise fashion. For example, as illustrated in FIG. 13, the user selects a desired thumbnail image 1302 on a UI 1301 by using a mouse pointer 1303, and right-clicks to display a dialog that enables input of the satisfaction rating. The user can select the number of stars on the menu according to the his/her preference. In the present exemplary embodiment, the higher the satisfaction rating, the greater the number of stars the user sets.

The image sensing unit 203 may automatically set satisfaction ratings without the user's manual setting. For example, suppose that the user clicks on a desired image file in the state of a list view of image thumbnails illustrated in FIG. 8 to enter a single-image display screen. The image sensing unit 203 may count the number of times of such screen transitions and set the satisfaction rating according to the number. For example, the more frequently an image is viewed, the more desirable the image is determined to be by the user.

In another example, the image sensing unit 203 may use the number of times of printing as a satisfaction rating. For example, when the user prints an image, the image sensing unit 203 may set the satisfaction rating of the image to be high, considering that the user likes the image. In such a case, the image sensing unit 203 counts the number of times of printing, and sets the satisfaction rating according to the number of times of printing.

As has been described above, the user may manually set a satisfaction rating. The image sensing unit 203 may set a satisfaction rating according to the number of views or according to the number of times of printing. By using an XML format as illustrated in FIG. 33A, the image sensing unit 203 separately stores such settings and measured information into an UserInfo tag in the database unit 202. For example, the image sensing unit 203 stores the satisfaction rating with a FavoriteRate tag, the number of views with a ViewingTimes tag, and the number of times of printing with a PrintingTimes tag.

Another example of the information set image by image is event information. Examples of event information include a family trip "travel," a commencement or continuation ceremony "graduation," and a wedding ceremony "wedding."

Figure 14:
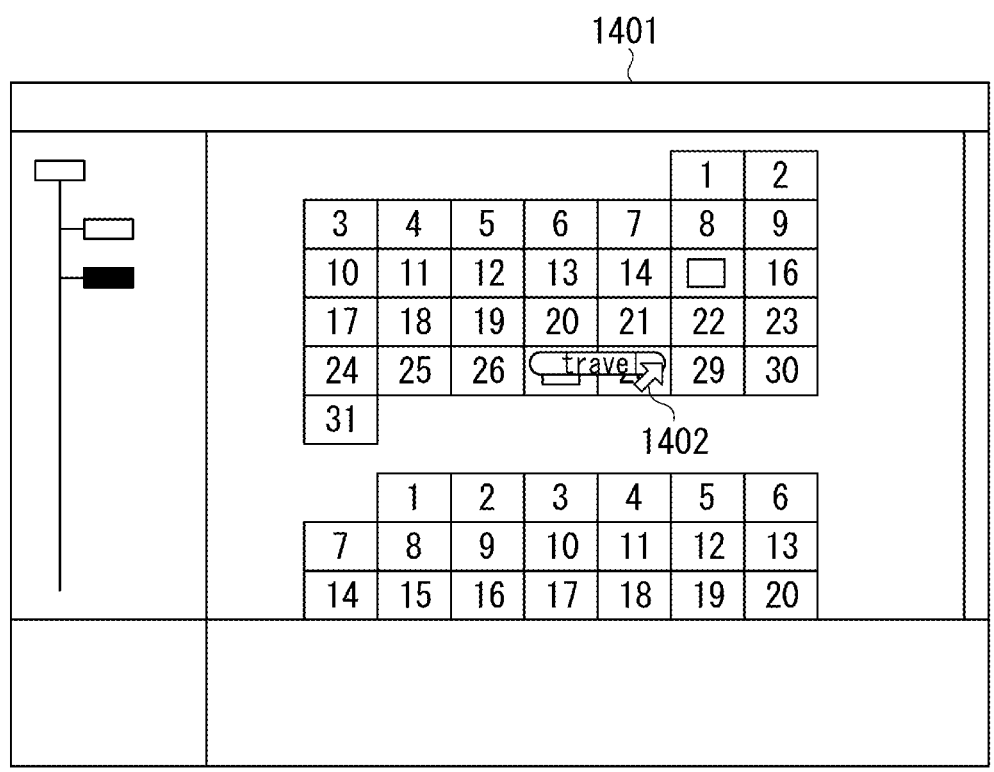
FIG. 14 illustrates an example UI for manually inputting event information.

As illustrated in FIG. 14, the user may specify an event by designating a desired date on a calendar by using a mouse pointer 1402 and inputting an event name of that date. The specified event name is included in the XML format illustrated in FIG. 33A as a part of the attribute information about the image. In the XML format of FIG. 33A, an Event tag in the UserInfo tag is used to link the event name and the image. Hereinafter, "to link" refers to "to associate."

Next, attribute information about a person will be described.

Figure 15:
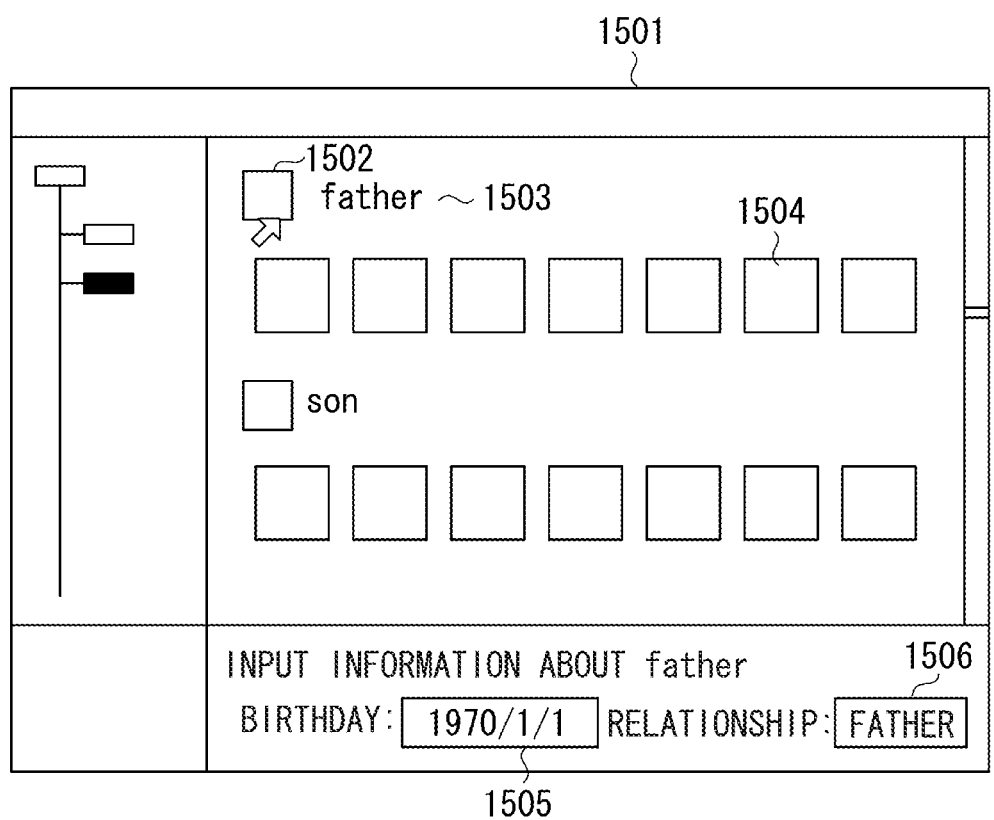
FIG. 15 illustrates an example UI for manually inputting person attribute information.

FIG. 15 illustrates a UI for inputting attribute information about a person. In FIG. 15, a representative face image 1502 of a given person (in this case, "father") is displayed next to a display area 1503 of a person name (person ID) of the given person. Images (thumbnails) 1504 are ones that are detected from other images and determined to have similar face feature amounts in step S506. In FIG. 15, the images 1504 determined to have similar face feature amounts in step S506 are displayed in a list form under the person ID 1503.

Immediately after the end of the sensing processing, as illustrated in FIG. 7, the person groups have no name input.

The user can designate a "No name" portion 703 with a mouse pointer to input an arbitrary person name.

Each person's birthday and relationship to the user who operates the application may be set as attribute information about the person. The user can click a representative face image 1502 of a person in FIG. 15 to input the birthday of the clicked person in a first input section 1505 as illustrated at the bottom of the screen. The user can also input relationship information about the clicked person in a second input section 1506.

Unlike the foregoing attribute information associated with images, such input person attribute information is managed in the database unit 202 separately from the image attribute information by using an XML format as illustrated in FIG. 33B.

As illustrated in FIG. 12, the manually set names may be linked with and managed by dictionary IDs separately from the XML format.

Figure 16:
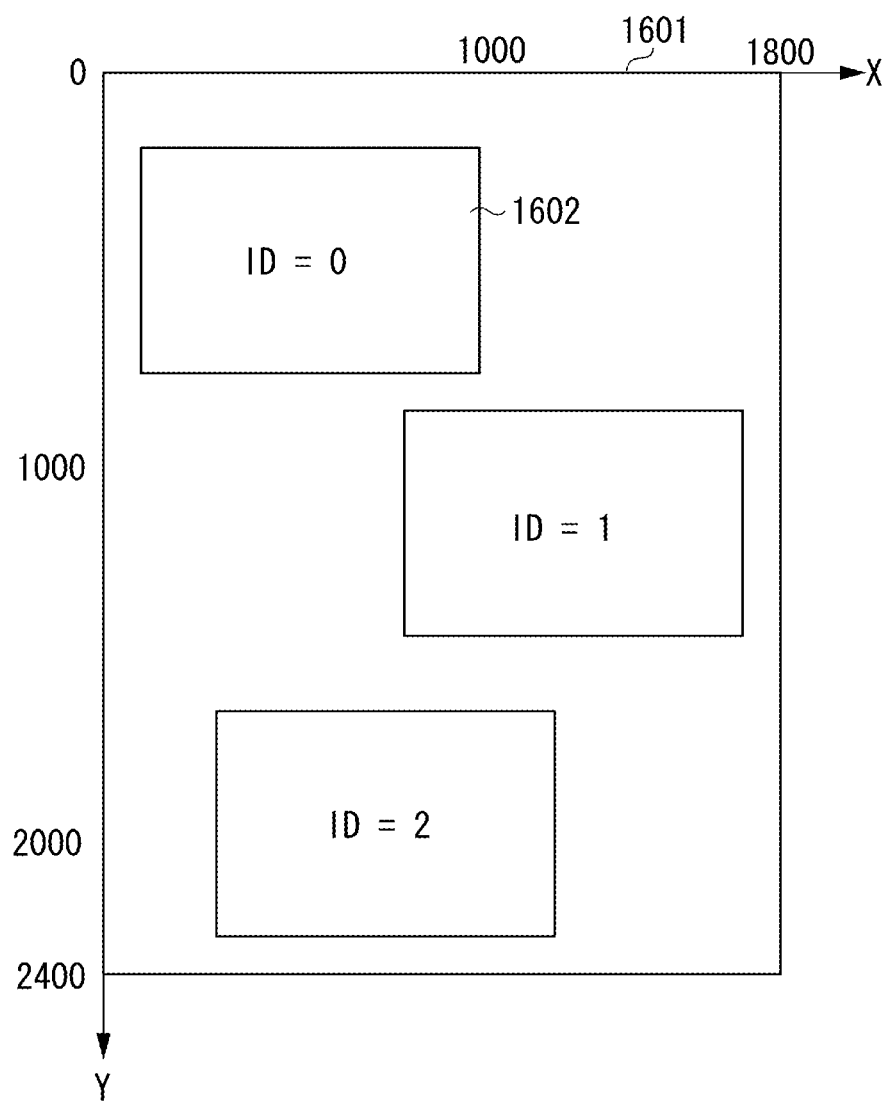
FIG. 16 illustrates an example layout template.
Figure 17:
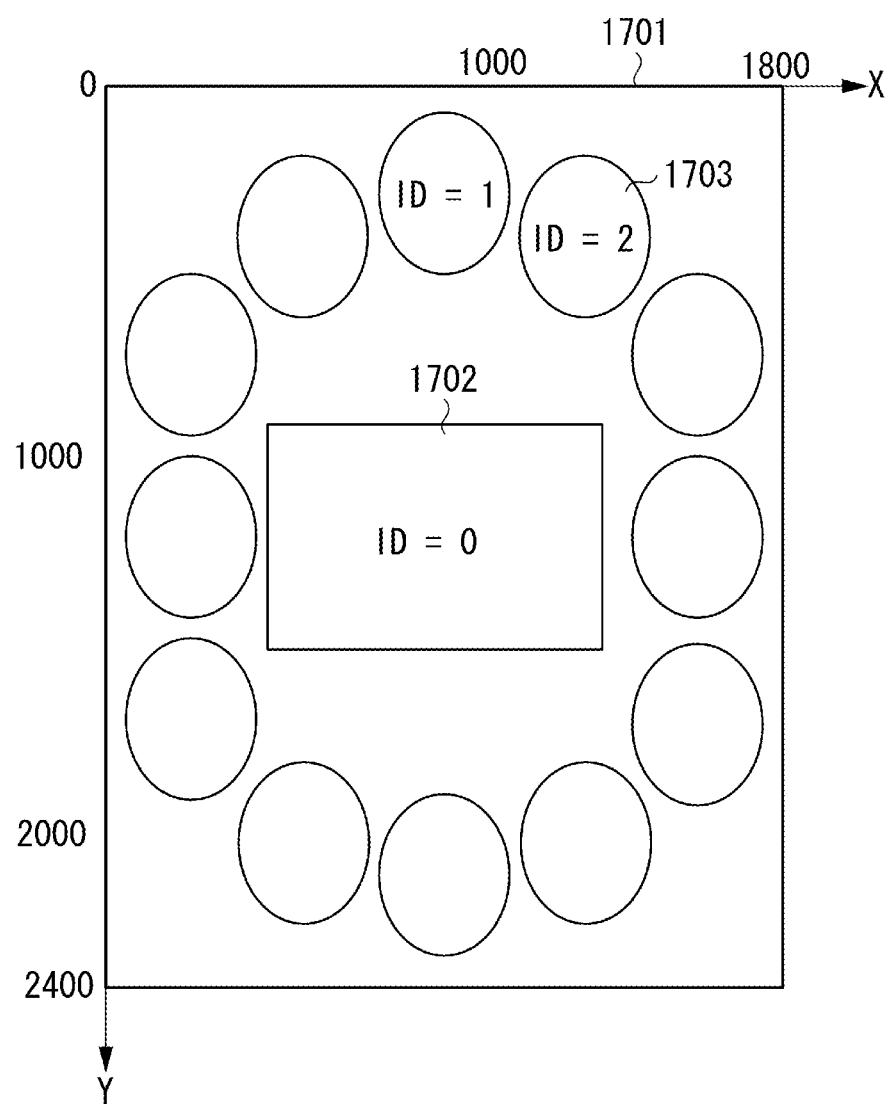
FIG. 17 illustrates an alternate example layout template.

In the present exemplary embodiment, the layout generation unit 205 performs layout generation processing by using various layout templates prepared in advance. Layout templates refer to ones such as illustrated in FIGS. 16 and 17. A layout template includes a plurality of image layout frames (hereinafter, synonymous with slots) 1602, 1702, and/or 1703 within a layout sheet size.

There are prepared a large number of such templates. The templates may be stored in the secondary storage device 103 in advance when software for implementing the present exemplary embodiment is installed on the image processing apparatus 115. Alternatively, the layout generation unit 205 may acquire an arbitrary template group from the external server 114 located on the Internet connected via the IF 107 and/or the wireless LAN 109.

The templates may be written in a highly-versatile structured language. Examples include XML which is used to store the foregoing sensing results. FIGS. 34 and 35 illustrate examples of XML data.

In such examples, basic information about a layout page is written with a BASIC tag. Examples of the basic information include the layout's theme, page size, and page resolution (dpi). In the examples, a Theme tag, which describes a layout theme, is blank when the templates are in an initial state. A page size of A4 and a resolution of 300 dpi are set as basic information.

ImageSlot tags describe information about the foregoing image layout frames. An ImageSlot tag contains two tags, namely, an ID tag and a POSITION tag which describe an ID and position of an image layout frame. As illustrated in FIGS. 16 and 17, such position information is defined, for example, in an X-Y coordinate system with an origin at the top left.

The ImageSlot tags also set a slot shape and a recommended person group name to be arranged for the respective slots. For example, the template of FIG. 16 recommends that all slots have a rectangular shape "rectangle" as described by the Shape tags of FIG. 34, and a person group name "MainGroup" be arranged for all the slots as described by the PersonGroup tags.

As illustrated in FIG. 35, the template of FIG. 17 describes that a slot of ID=0 arranged in the center has a rectangular shape, with "SubGroup" as a person group. The other slots of ID=1, 2, . . . are recommended to have an "ellipse" shape with "MainGroup" as a person group each.

In the present exemplary embodiment, a large number of such templates are retained.

The application according to the present exemplary embodiment can perform analysis processing on input image groups, automatically group persons, and display the result on a UI. Viewing the result, the user can input attribute information such as a name and a birthday for each person group, and/or set a satisfaction rating for each image. The application can also retain a large number of layout templates classified by theme.

Satisfying the foregoing conditions, the application of the present exemplary embodiment performs, at predetermined timing, processing for automatically generating collage layouts that the user may like and presenting the collage layouts to the user (hereafter, referred to as layout suggestion processing).

FIG. 6 illustrates a basic flowchart for performing the layout suggestion processing.

In step S601, the scenario generation unit 204 determines a scenario of the layout suggestion processing. A scenario includes information about determination of a theme and a template of a layout to suggest, setting of a person (main character) to place emphasis on in the layout, and selection of image groups to be used for layout generation.

A method for determining a scenario will be described below in conjunction with two scenario examples.

Suppose, for example, that processing for suggesting a layout of a birthday of each person is set to be automatically performed two weeks before. Suppose also that the first birthday of a person who is automatically grouped as "son" in FIG. 15 is approaching. In such a case, the scenario generation unit 204 determines a theme of the layout to be a growth record "growth". The scenario generation unit 204 then selects a template. Here, the scenario generation unit 204 selects one suitable for a growth record like FIG. 17, and writes "growth" to the Theme tag portion of the XML as illustrated in FIG. 36. The scenario generation unit 204 then sets "son" as a main character "MainGroup" to place emphasis on during layout. The scenario generation unit 204 sets "son" and "father" as "SubGroup" to place a secondary emphasis on during layout. The scenario generation unit 204 then selects image groups to be used for layout. In the case of this example, the scenario generation unit 204 refers to the database unit 202, extracts a large number of image groups including "son" from image groups that have been captured since the birthday of the person "son," and generates a list of the extracted image groups. The scenario generation unit 204 thereby determines a scenario for a growth record layout.

As another example, suppose that the layout suggestion processing is set to be performed if predetermined event information has been registered within a month. If the event information registered in FIG. 14 shows that there was a family trip several days before and a large number of images of the family trip are stored in the secondary storage device 103, the scenario generation unit 204 determines a scenario for suggesting a layout of a family trip. In such a case, the scenario generation unit 204 determines a theme of the layout to be "travel." The scenario generation unit 204 then selects a template. In this case, the scenario generation unit 204 selects a layout like FIG. 16, and writes "travel" to the Theme tag portion of the XML as illustrated in FIG. 37. The scenario generation unit 204 then sets "son," "mother," and "father" as main characters "MainGroup" to place emphasis on during layout. By utilizing a characteristic of the XML, the scenario generation unit 204 can thus set a plurality of persons as "MainGroup."

Next, the scenario generation unit 204 selects image groups to be used for layout. In the case of this example, the scenario generation unit 204 refers to the database unit 202, extracts a large number of image groups linked with the foregoing travel event, and generates a list of the extracted image groups. The scenario generation unit 204 thereby determines a scenario for a family trip layout.

Figure 18:
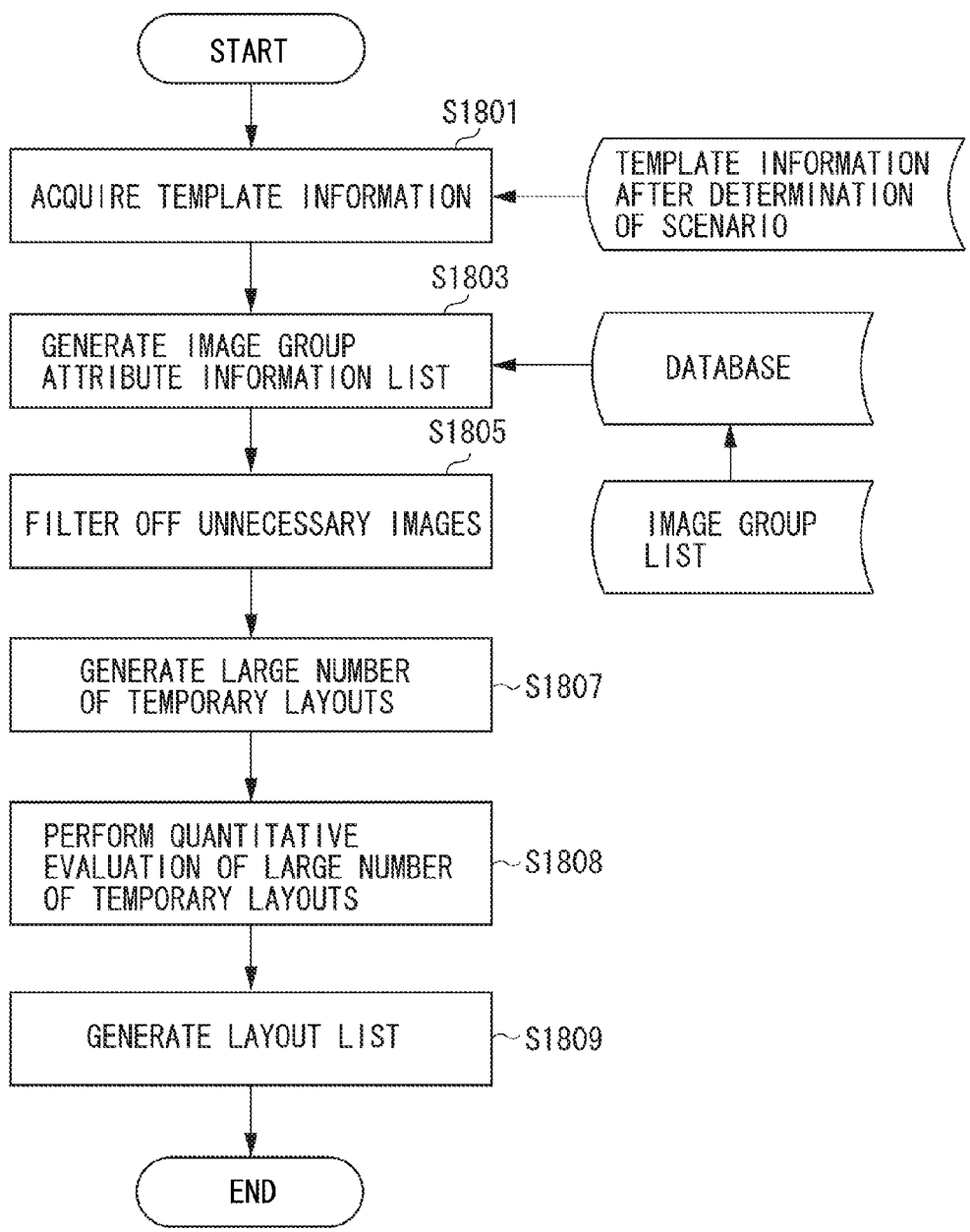
FIG. 18 is a flowchart of automatic layout generation processing according to the first exemplary embodiment.

In step S603 of FIG. 6, the layout generation unit 205 performs automatic layout generation processing based on the scenario described above. FIG. 18 illustrates a detailed processing flow of the layout generation unit 205. Referring to FIG. 18, the processing steps will be described below.

In step S1801, the layout generation unit 205 acquires template information that is determined by the foregoing scenario determination processing and includes the theme and person group information.

In step S1803, the layout generation unit 205 acquires feature amounts of images from the database unit 202 image by image to generate an image group attribute information list based on an image list determined by the scenario. As employed herein, the image group attribute information list includes an IMAGEINFO tag illustrated FIG. 33A as many as images included in the image list.

The layout generation unit 205 subsequently performs the automatic layout generation processing of steps S1805 to S1809 based on the image group attribute information list.

As described above, the automatic layout generation processing of the present exemplary embodiment will not directly handle image data itself, but uses the attribute information that has been stored in the database unit 202 by performing the sensing processing on each image in advance. The reason is to avoid needing an extremely large memory area for storing image groups when handling image data itself. As a result, the amount of memory needed for the automatic layout generation processing can be reduced.

Figure 19:
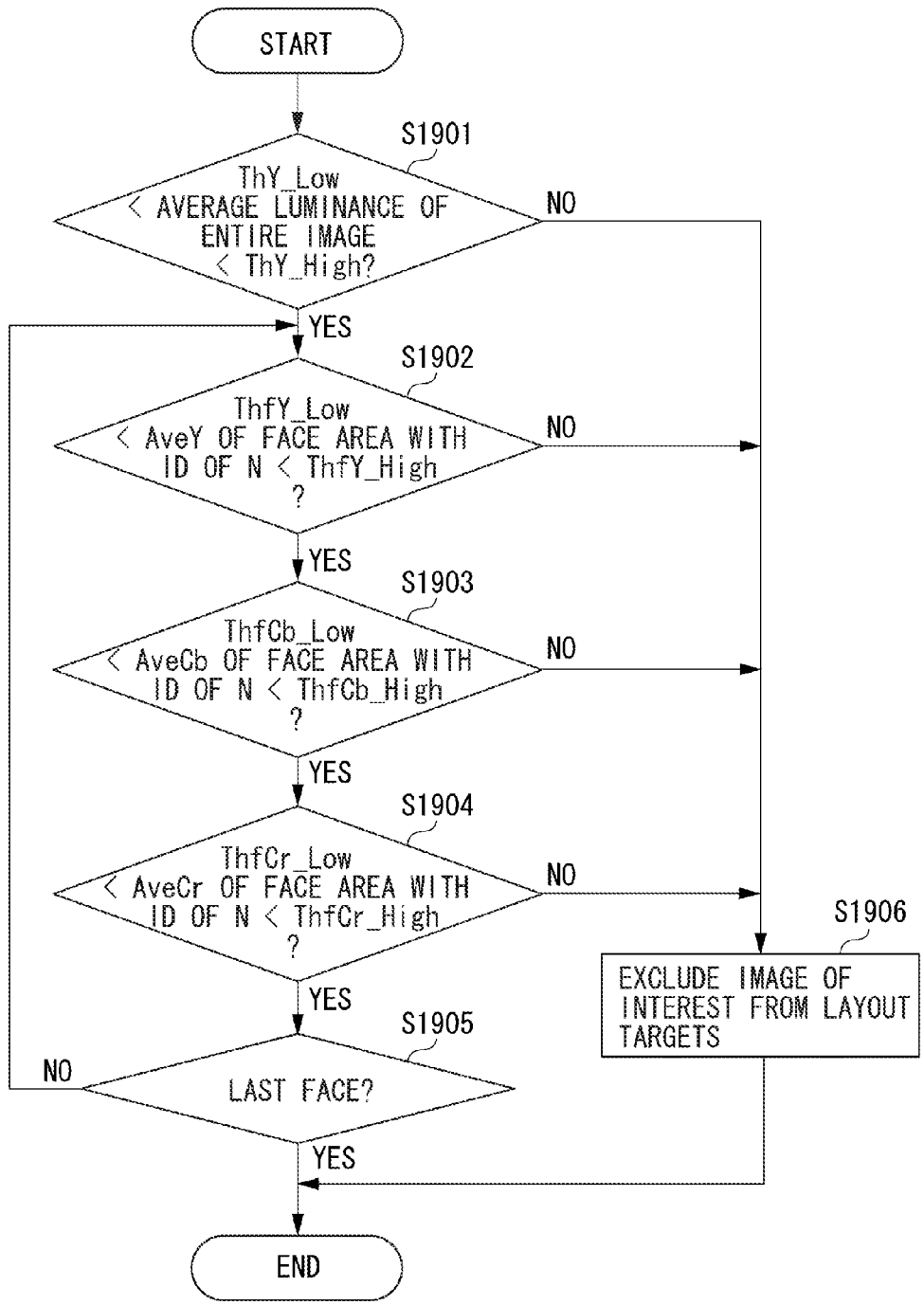
FIG. 19 is a flowchart of unnecessary image filtering processing according to the first exemplary embodiment.

Specifically, in step S1805, the layout generation unit 205 filters off unnecessary images in the input image groups by using the attribute information about the input image groups. The layout generation unit 205 performs the filtering processing on each image according to a flow of FIG. 19. In FIG. 19, in step S1901, the layout generation unit 205 initially determines whether an average luminance of the entire image is included in a range of certain thresholds (ThY_Low and ThY_High). If NO (NO in step S1901), the layout generation unit 205 proceeds to step S1906. In step S1906, the layout generation unit 205 excludes the image of interest from layout targets.

In steps S1902 to S1905, the layout generation unit 205 similarly determines whether an average luminance (AveY) and average color differences (AveCb and AveCr) of each face area included in the image of interest are included in ranges of predetermined thresholds that express favorable skin color areas. Only images that are determined to be YES in all of steps S1902 to S1905 are subjected to the subsequent layout generation processing. Specifically, in step S1902, the layout generation unit 205 determines whether AveY of a face area with an ID of N is included in a range of predetermined thresholds (ThfY_Low and ThfY_High). In step S1903, the layout generation unit 205 determines whether AveCb of the face area with the ID of N is included in a range of predetermined thresholds (ThfCb_Low and ThfCb_High). In step S1904, the layout generation unit 205 determines whether AveCr of the face area with the ID of N is included in a range of predetermined thresholds (ThfCr_Low and ThfCr_High). In step S1905, the layout generation unit 205 determines whether the face area is of the last face. If the face area is not of the last face (NO in step S1905), the layout generation unit 205 returns to step S1902. If the face area is of the last face (YES in step S1905), the layout generation unit 205 ends the filtering processing.

Note that this filtering processing is intended to exclude images that can be determined to be obviously unnecessary in the subsequent temporary layout generation processing. The thresholds are therefore desirably set to be relatively mild. For example, in the determination of the average luminance of the entire image in step S1901, fewer images are determined to be YES if the difference between ThY_High and ThY_Low is extremely small as compared to a dynamic range of the images. To avoid such situations, the filtering processing of the present exemplary embodiment sets the thresholds such that the difference is set as large as possible and images determined to be obviously abnormal can be excluded.

In step S1807 of FIG. 18, the layout generation unit 205 generates a large number (L) of temporary layouts by using image groups determined to be the layout targets by the foregoing filtering processing. The layout generation unit 205 generates the temporary layouts by repeating processing for arbitrarily applying input images to image layout frames of the acquired template. For example, the layout generation unit 205 determines the following parameters (image selection, arrangement, and trimming) at random.

Figure 20:
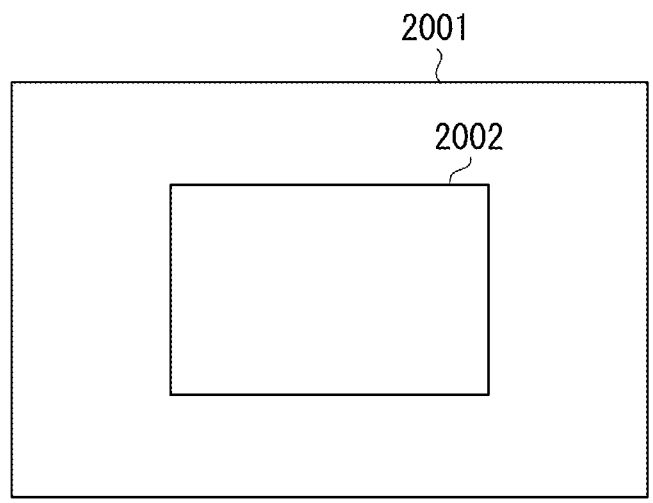
FIG. 20 illustrates an example of automatic trimming processing according to the first exemplary embodiment.

Examples of an image selection standard include which images to select from the image groups, given N image layout frames for layout. Examples of an arrangement standard include which image layout frames to arrange the selected plurality of images in. Examples of a trimming standard include a trimming ratio which indicates the degree of trimming processing to perform when arranging an image. For example, the trimming ratio is expressed as 0% to 100%. As illustrated in FIG. 20, the layout generation unit 205 trims an image at a predetermined trimming ratio with respect to the center of the image. In FIG. 20, an entire image 2001 is trimmed with a trimming frame 2002 at a trimming ratio of 50%.

Based on the foregoing image selection, arrangement, and trimming standards, the layout generation unit 205 generates temporary layouts as many as possible. Each of the generated temporary layouts can be expressed like an XML of FIG. 38. In each slot, an ID of the selected and arranged image is written with an ImageID tag, and the trimming ratio is written with a TrimmingRatio Tag.

The number L of temporary layouts to be generated here is determined according to the amount of processing of quantitative evaluations of the temporary layouts to be described below and the performance of the image processing apparatus 115 which performs the quantitative evaluations. For example, in the present exemplary embodiment, the layout generation unit 205 generated more than several hundreds of thousands of temporary layouts. The layout generation unit 205 may add IDs to the respective generated temporary layouts and store the resultant into the secondary storage device 102 as files in the XML format of FIG. 38. The layout generation unit 205 may store the generated temporary layouts into the RAM 102 by using other data structures.

In step S1808 of FIG. 18, the layout generation unit 205 performs quantitative evaluations of the large number of temporary layouts generated. Specifically, the layout generation unit 205 evaluates each of the L generated temporary layouts by using predetermined layout evaluation amounts. Table 3 lists the layout evaluation amounts according to the present exemplary embodiment. As listed in Table 3, the layout evaluation amounts used in the present exemplary embodiment are mostly classified into three categories.

TABLE 3

Examples of Layout Evaluation Values for Automatic Layout

| Category | Evaluation amount | Score range | growth | Degree of importance (weight W) by theme travel | ... |
|---|---|---|---|---|---|
| Image-specific evaluations | Brightness adequacy | 0 to 100 | 0.5 | 1.0 | |
| | Saturation adequacy | 0 to 100 | 0.5 | 1.0 | |
| Image and slot matching degree evaluations | Degree of person matching | 0 to 100 | 1.0 | 0.5 | |
| | Over trimming determination | 0 to 100 | 1.0 | 0.5 | |
| In-page balance evaluations | Image similarity | 0 to 100 | 0.5 | 1.0 | |
| | Color variations | 0 to 100 | 0.5 | 1.0 | |
| | Face size variations | 0 to 100 | 0.5 | 1.0 | |
| Others | User preference | 0 to 100 | 0.5 | 0.8 | |

Figure 21:
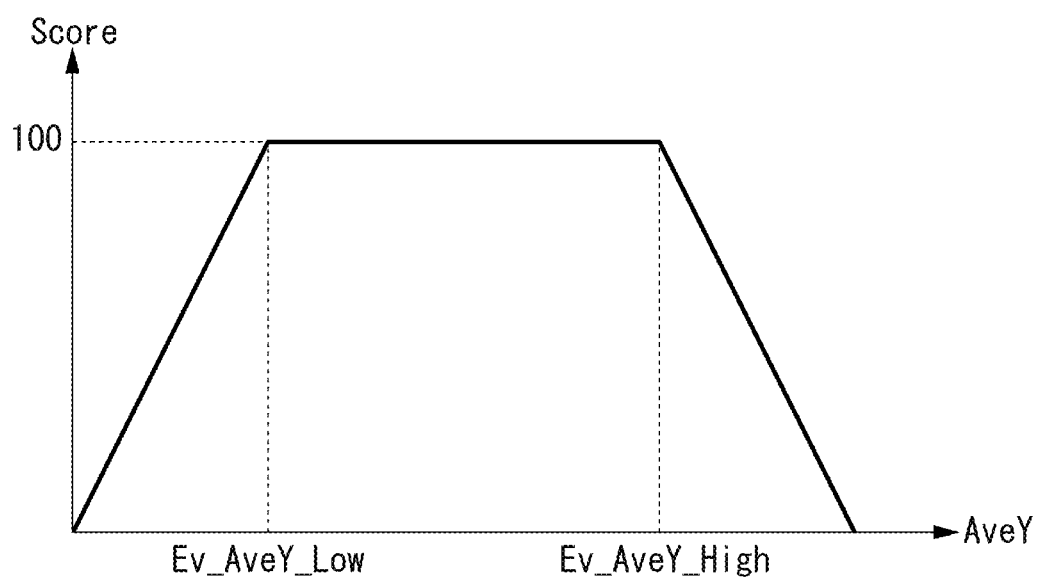
FIG. 21 illustrates a method for calculating a brightness adequacy according to the first exemplary embodiment.
Figure 22:
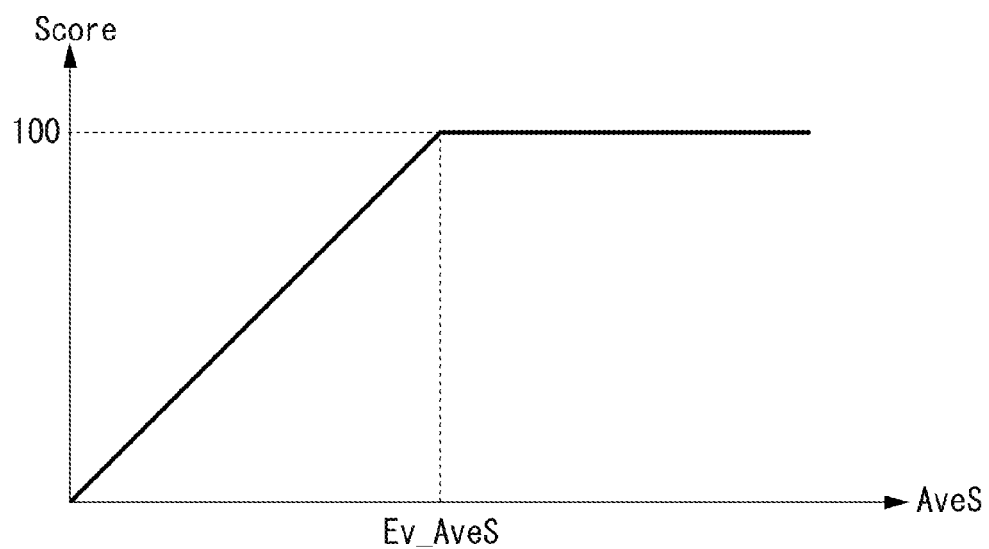
FIG. 22 illustrates a method for calculating a saturation adequacy according to the first exemplary embodiment.

The first category includes image-specific evaluation amounts. The image-specific evaluation amounts are intended to determine and indicate the brightness, saturation, and the state of shakes and blur of an image in scores. Examples of the scores according to the present exemplary embodiment are described below. As illustrated in FIG. 21, a brightness adequacy is set so that its score value is 100 when the average luminance of an entire image is in a certain range, and the score value decreases as the average luminance deviates from the range. As illustrated in FIG. 22, a saturation adequacy is set so that its score value is 100 if the average saturation of the entire image is higher than a certain saturation value, and the score value decreases gradually as the average saturation becomes lower than the predetermined value.

Figure 23:
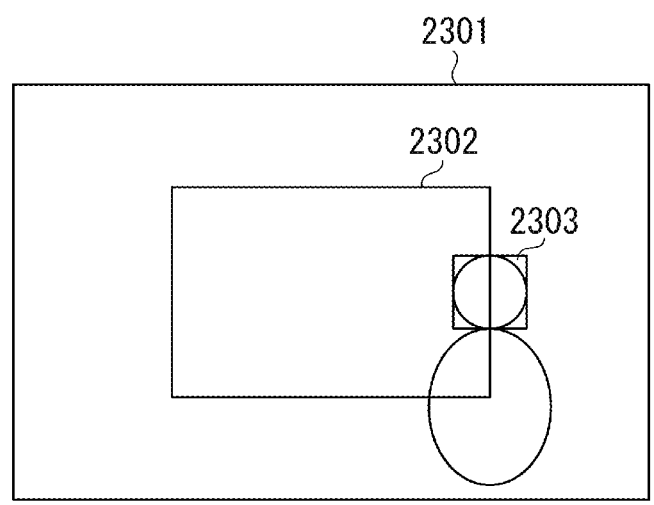
FIG. 23 illustrates over-trimming determination processing according to the first exemplary embodiment.

The second category includes evaluations about the degrees of matching of an image and a slot. Examples of the evaluations about the degrees of matching of an image and a slot include a degree of person matching and an over-trimming determination. The degree of person matching indicates a matching rate between a person or persons specified for a slot and a person or persons in the image actually arranged in the slot. For example, suppose that a slot is a person group specified by an XML, and "father" and "son" are designated for the slot. If an image assigned to the slot includes the two persons, the degree of person matching of the slot has a score value of 100. If the image includes either one of the persons, the degree of matching has a score value of 50. If the image includes neither of the persons, the score value is zero. For a degree of matching within a page, the layout generation unit 205 determines an average of the degrees of matching calculated for respective slots. For an over-trimming determination of a trimming area 2002, the layout generation unit 205 calculates a score value in the range of 0 to 100. For example, as illustrated in FIG. 23, if a position 2303 of a face in an image is known, the layout generation unit 205 calculates the score value according to the area of the trimmed portion. If the face area is not trimmed, the score is 100. On the other hand, if the entire face area is trimmed, the score value is zero.

The third category includes evaluations of balance within a layout page. Examples of evaluation values for evaluating balance include a degree of image similarity, color variations, and face size variations. The degree of image similarity refers to the degree of similarity of images within a layout page. The layout generation unit 205 calculates the degree of image similarity with respect to each of the large number of temporary layouts generated. For example, when generating a layout on a travel theme, it may not be a good layout to include only too similar images having high degrees of similarity. For example, the layout generation unit 205 can evaluate degrees of similarity based on the photographing date and time. Images having similar photographing dates and times are likely to have been captured in similar locations. Images having different photographing dates and times are likely to have been captured in different locations and on different scenes accordingly. As illustrated in FIG. 33A, the layout generation unit 205 can acquire photographing dates and times from the attribute information about the images, stored as image attribute information in the database unit 202 in advance. The layout generation unit 205 performs the following calculation to determine the degree of similarity from the photographing dates and time. For example, suppose that four images listed in Table 4 are laid out on a temporary layout of interest.

In FIG. 33A, photographing date and time information is attached to each image identified by an image ID. Specifically, the attached photographing date and time information includes a year, month, date, and time (year: YYYY, month: MM, date: DD, hour: HH, minute: MM, and second: SS). The layout generation unit 205 calculates a minimum photographing time interval among the four images.

TABLE 4

| Image ID | Photographing date and time (YYYYMMDD:HHMMSS) |
|---|---|
| 25 | 20100101:120000 |
| 86 | 20100101:150000 |
| 102 | 20100101:170000 |
| 108 | 20110101:173000 |

Here, the minimum interval is 30 minutes between the images having the image IDs of 102 and 108. The layout generation unit 205 stores this interval as MinInterval in units of seconds. Specifically, the minimum interval of 30 minutes is 1800 seconds. The layout generation unit 205 calculates MinInterval with respect to each of the L temporary layouts, and stores the MinInterval into an array stMinInterval[l]. The layout generation unit 205 determines a maximum value MaxMinInterval in stMinInterval[l]. The layout generation unit 205 then can determine an evaluation value of the degree of similarity of an l-th temporary layout, Similarity[l], by the following equation:

$$\text{Similarity}[l] = 100 \times \text{stMinInterval}[l] / \text{MaxMinInterval} \qquad \text{Eq. 2}$$

The value of Similarity[l] approaches 100 as the minimum photographing time interval increases. The value of Similarity[l] approaches 0 as the minimum photographing time interval decreases. Similarity[l] is thus useful as an image similarity degree evaluation value.

Next, color variations will be described. For example, when generating a layout on a travel theme, it may not be a good layout to include only images of too similar colors (for example, blue of the blue sky or green of mountains). In such a case, layouts having greater color variations are highly evaluated. The layout generation unit 205 calculates a variance of the average hues AveH of images included in an l-th temporary layout of interest, and stores the variance as a degree of color variations tmpColorVariance[l]. The layout generation unit 205 determines a maximum value MaxColorVariance in tmpColorVariance[l]. The layout generation unit 205 then can determine an evaluation value of the degree of color variations of an l-th temporary layout, ColorVariance[l], by the following equation:

$$\text{ColorVariance}[l] = 100 \times \text{tmpColorVariance}[l] / \text{MaxColorVariance} \qquad \text{Eq. 3}$$

The value of ColorVariance[l] approaches 100 as variations of the averages hues of the images arranged in a page increase. The value of ColorVariance[l] approaches 0 as the variations decrease. ColorVariance[l] can thus be used as an evaluation value of the degree of color variations.

Next, face size variations will be described. For example, when generating a layout on a travel theme, it may not be a good layout to include only images of too similar face sizes. A good layout is considered to include large faces and small faces arranged in a favorable balance on a layout page. In such a case, layouts having large face size variations are highly evaluated. The layout generation unit 205 stores a variance value of the sizes of faces arranged on an l-th temporary layout of interest as tmpFaceVariance[l]. The size of a face refers to the diagonal distance from a top left to a bottom right of the face position. The layout generation unit 205 determines a maximum value MaxFaceVariance in tmpFaceVariance[l]. The layout generation unit 205 then can determine an evaluation value of the degree of face size variations of an l-th temporary layout, FaceVariance[l], by the following equation:

$$\text{FaceVariance}[l] = 100 \times \text{tmpFaceVariance}[l] / \text{MaxFaceVariance} \qquad \text{Eq. 4}$$

The value of FaceVariance[l] approaches 100 as variations of the sizes of the faces arranged on a sheet increase. The value of FaceVariance[l] approaches 0 as the variations decrease. FaceVariance[l] can thus be used as an evaluation value of the degree of face size variations.

The others category may include the user's preference evaluations.

The foregoing plurality of evaluation values calculated for each temporary layout will be referred to integrally as layout evaluation values of each temporary layout. A comprehensive evaluation value of an l-th temporary layout will be denoted by EvalLayout[l]. The N evaluation values calculated above (including the evaluations values of Table 3) will be denoted by EvalValue[n]. The layout generation unit 205 can determine the comprehensive evaluation value by the following equation:

$$\text{EvalLayout}[l] = \sum_{n=0}^{N} \text{EvalValue}[n] \times W[n] \qquad \text{Eq. 5}$$

In the foregoing equation, W[n] is the weight of each evaluation value on each scene, listed in Table 3. Different weights are set for different layout themes. For example, compare the themes of a growth record "growth" and a trip "travel" listed in Table 3. On a travel theme, it is often desirable to lay out a large number of pictures having as high a quality as possible on various scenes. The weights are therefore set to place emphasis on the image-specific evaluation values and the in-pace balance evaluation values. In contact, for a growth record "growth", whether the main character of the growth record matches the slots without fail is often more important than image variations. The weights are thus set to place emphasis on the image and slot matching degree evaluations over the in-page balance and image-specific evaluations. In the present exemplary embodiment, the degrees of importance by theme are set as listed in Table 3.

In step S1809, by using EvalLayout[l] thus calculated, the layout generation unit 205 generates a layout list LayoutList [k] for displaying layout results. The layout list LayoutList [k] stores the identifiers 1 of a predetermined number (for example, five) of EvalLayout[l] having the highest evaluation values. For example, if the 50th temporary layout (l=50) scores the highest, LayoutList[0]=50. The layout generation unit 205 similarly stores the identifiers 1 of the temporary layouts having the second highest and subsequent score values into LayoutList[1] and later.

Figure 24:
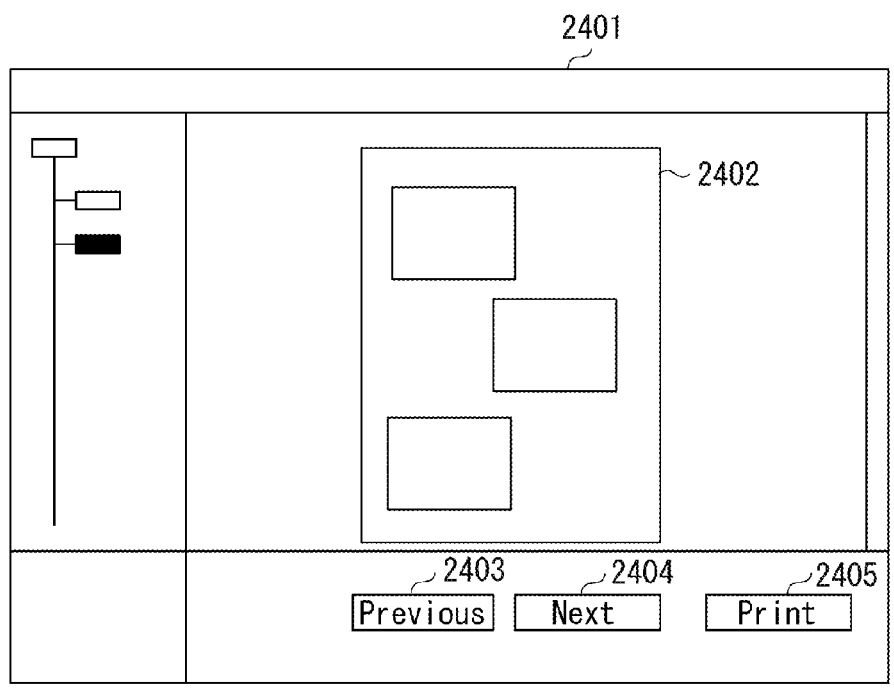
FIG. 24 illustrates a display example of a result of automatic layout generation according to the first exemplary embodiment.

Referring back to FIG. 6, in step S605, the rendering unit 206 renders a layout result obtained by the foregoing automatic layout generation processing, and displays the rendering result as illustrated in FIG. 24. In step S605, the rendering unit 206 initially reads the identifier 1 stored in LayoutList[0], and reads the temporary layout corresponding to the identifier 1 from the secondary storage device 103 or the RAM 102. As described above, the temporary layout includes template information and image IDs assigned to respective slots included in the template. Based on such information, the rendering unit 206 renders the temporary layout by using drawing functions of the operating system (OS) running on the image processing apparatus 115, and displays a layout result 2402 as illustrated in FIG. 24.

In FIG. 24, the user presses a next button 2404 to read the identifier 1 of LayoutList[1] having the second score. The rendering unit 206 performs rendering as described above, and displays the resultant. The user can thus view different variations of suggested layouts. The user can press a previous button 2403 to redisplay the previously displayed layout. If the user likes the displayed layout, the user can press a print button 2405 to print out the layout result 2402 from the printer 112 connected to the image processing apparatus 115.

Now, processing for updating the face dictionary used in individual recognition according to the present exemplary embodiment will be described in detail. As employed herein, a face dictionary refers to face recognition information used for individual recognition.

Figure 11:
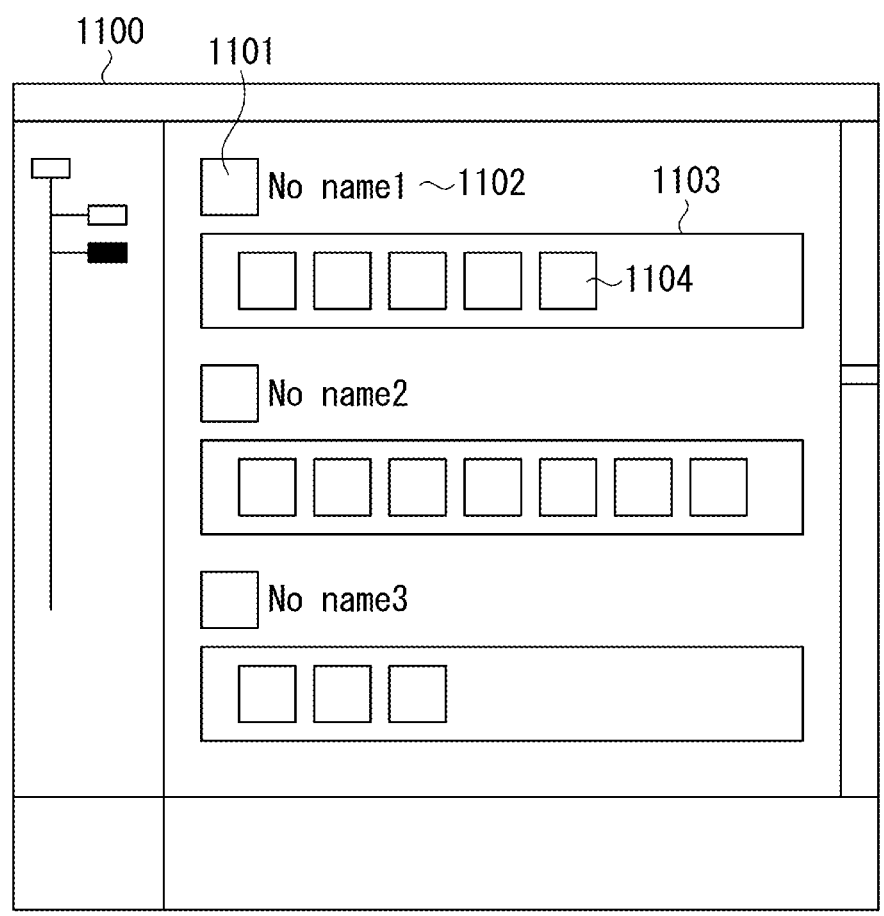
FIG. 11 illustrates a display example of person groups according to the first exemplary embodiment.
Figure 25:
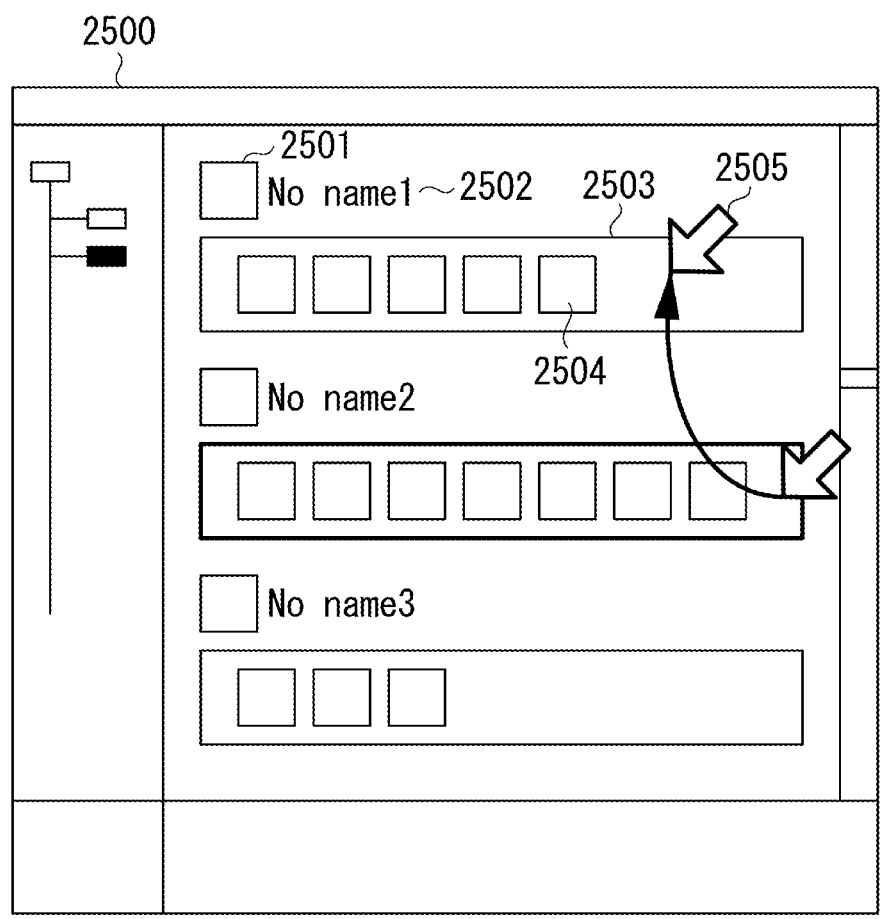
FIG. 25 illustrates a user's manual correction on a UI of the first exemplary embodiment.

As illustrated in FIG. 11, person groups displayed on a UI may include misrecognition. For example, father who is supposed to be the same person may be determined to be different persons, and predetermined face areas may be assigned to an incorrect person group by the person group generation processing. In other words, the same person may exist in a plurality of separate person groups. For example, when the same father wears an angry face and a smiling face, organs such as eyes and a mouth have different feature amounts. The same father can thus be recognized as different persons and associated with respective different dictionary IDs depending on facial expressions. As a result, the same father may be displayed as different persons on a UI. The user's correction operation in such a case will be described with reference to FIG. 25. FIG. 25 is an explanatory diagram illustrating a correction operation by the user.

On a UI display screen 2500 illustrated in FIG. 25, person IDs are displayed in display areas 2502. One or more face images 2704 of persons identified by the person IDs are displayed in respective display areas 2503.

Suppose that in FIG. 25, father who is angry is classified as No name1, and father who is smiling is classified as No name2. In such a case, the user performs a correction operation to bring the fathers into the same group. In other words, the user performs an operation for combining the different person groups of No name1 and No name2. Specifically, the user operates a mouse pointer 2505 to select and drag an entire image group classified as No name2 to the image group of No name1. By such an operation, the user combines the person group of No name1 with the person group of No name2.

As described above, the user operates the mouse pointer 2505 to drag one image group to another image group, whereby the person groups of No name1 and No name2 become one person group on the UI. Such a user operation explicitly indicates that the person classified as No name2 is the same person as the person classified as No name1. This user operation can be said to indicate both incorrect group information and correct group information. In such a manner, the person classified as No name1 and the person classified as No name2 become one person group according to a correction instruction from the user.

In the present exemplary embodiment, the image processing apparatus 115 correctly reflects the user's operation information on the face dictionary to improve the subsequent recognition accuracy. Processing for updating the face dictionary in response to such a combining operation by the user in the present exemplary embodiment will be described with reference to FIGS. 26A and 26B.

Figure 26A:
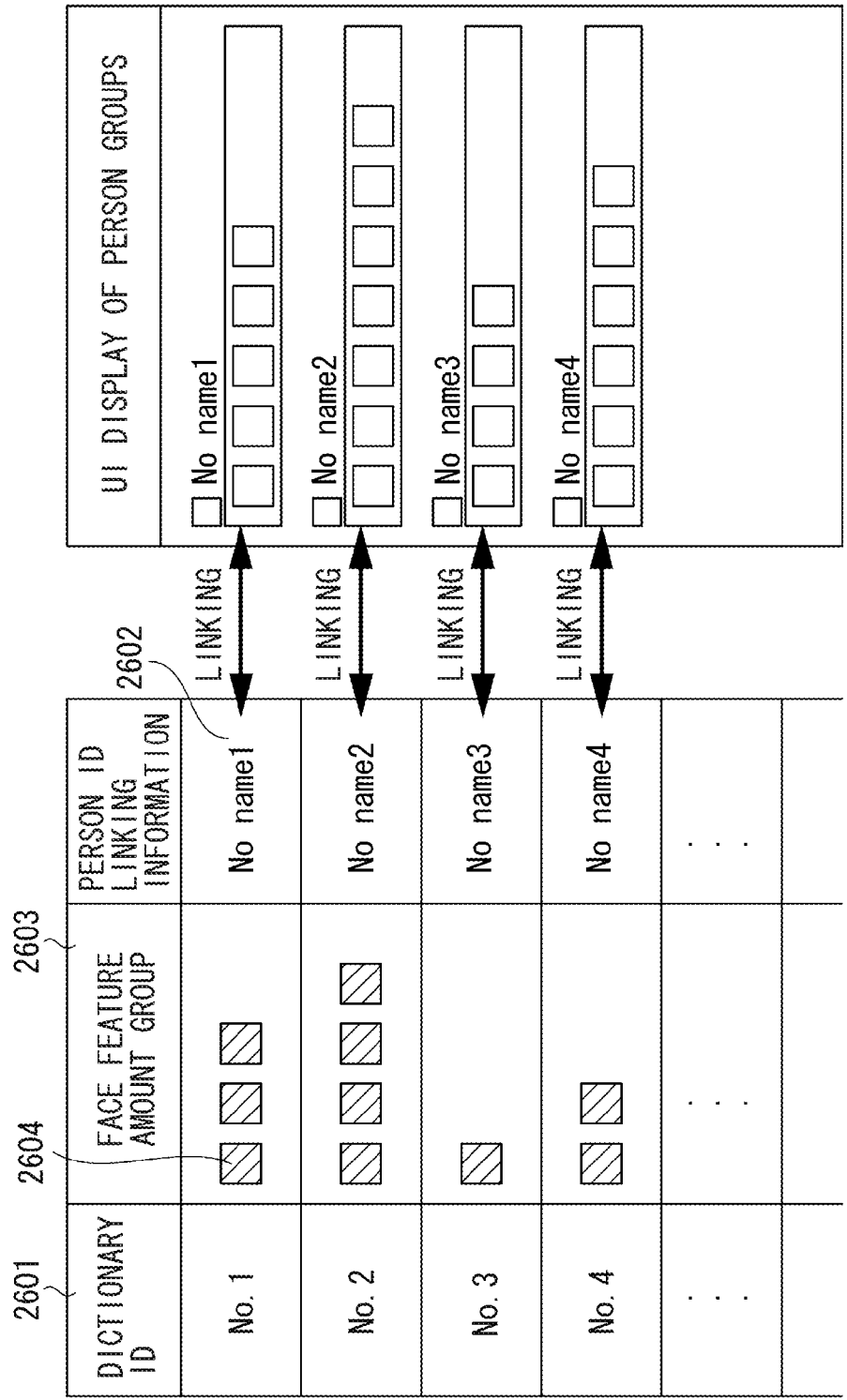
FIGS. 26A and 26B illustrate linking between dictionary IDs and person IDs according to the first exemplary embodiment.
Figure 26B:
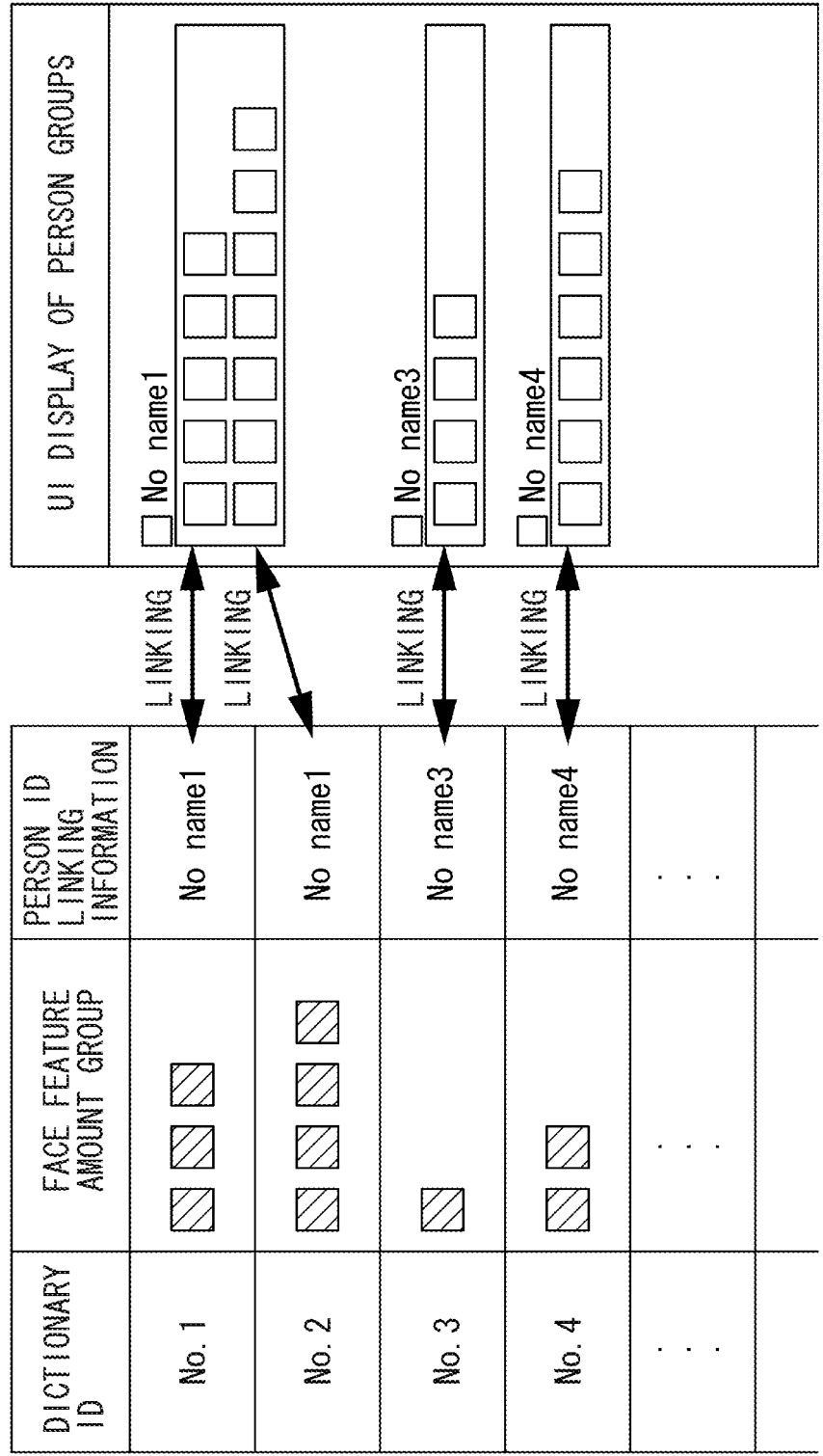
Figure 27:
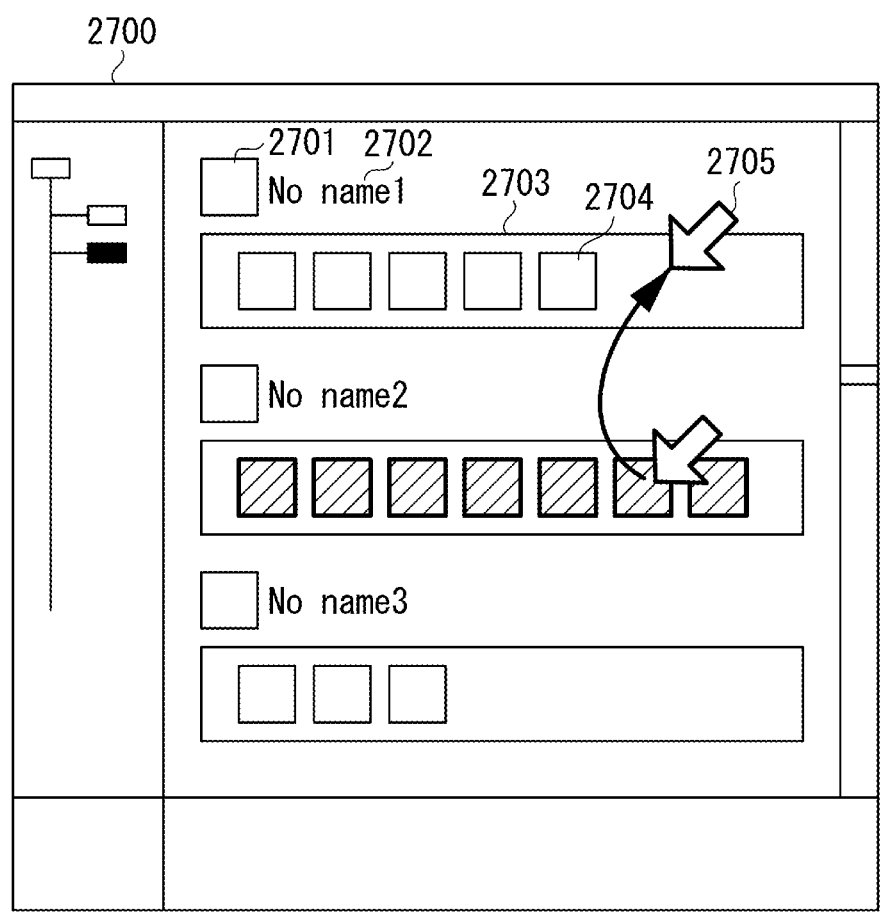
FIG. 27 illustrates the user's manual correction on a UI of a second exemplary embodiment.

FIGS. 26A and 26B are diagrams illustrating an internal configuration of the face dictionary. In FIGS. 26A and 26B, the face dictionary includes face feature amounts 2604 which are classified in units of face feature amounts 2604 having predetermined or higher degrees of similarity and stored as face feature amount groups 2603. A dictionary ID 2601 and a person ID 2602 are attached to each face feature amount group 2603. The dictionary IDs 2601 identify the face feature amount groups 2603 in the face dictionary. The person IDs 2602 identify the persons having the face feature amounts 2604.

In FIGS. 26A and 26B, the numbers of face feature amounts 2604 included in the face feature amount groups 2603 in the face dictionary do not coincide with the numbers of images displayed on a UI display of the person groups. The reason is that in the present exemplary embodiment, an upper limit of five is set to the number of face feature amounts 2604 registered in each face feature amount group 2603 in the face dictionary while there is no upper limit to the number of images displayed in each person group on the UI.

FIG. 26A is a diagram illustrating the internal structure of the face dictionary and the UI display before the user's combining operation. FIG. 26A illustrates a state where the dictionary IDs 2601 in the face dictionary are linked with the person IDs 2602 on the UI display in a one-to-one correspondence. As employed herein, "to link" means to associate. In the following description, "linking information" refers to association information.

In the present exemplary embodiment, in response to the user's combining operation on the UI display, the image processing apparatus 115 corrects linking information about the dictionary ID of No. 2 linked with No name2 in the face dictionary so that the dictionary ID is linked with No name1. That is, the image processing apparatus 115 corrects the person ID linking information about the dictionary ID of No. 2 to be No name1. This corrects the correspondence as illustrated in FIG. 26B.

As illustrated in FIG. 26A, the correspondence between the number of dictionary IDs 2601 and that of person IDs 2602 before the correction is 2:2. As illustrated in FIG. 26B, the correspondence between the number of dictionary IDs 2601 and that of person IDs 2602 after the correction is 2:1. That is, the number of dictionary IDs 2601 corresponding to one person ID 2602 increases in the face dictionary. On the UI display, the person groups of No name1 and No name2 before the correction are displayed as the same person group with one person ID 2602 of No name1.

On the UI display, the images based on the dictionary ID of No. 1 and the images based on the dictionary ID of No. 2 are displayed as the same group. In the face dictionary, the dictionary IDs 2601 continue being separately managed without the stored face feature amounts 2604 being updated. Such separate management of the dictionary IDs 2601 can avoid a drop in the recognition accuracy. If, on the other hand, face feature amounts that have originally been classified as those of different persons were combined as those of the same person, the acceptability in determining the degree of similarity at such dictionary IDs would increase. This would significantly facilitate misrecognition. In contrast, when a face image of father similar to the face feature amounts 2604 included in the face feature amount group 2603 having the dictionary ID 2601 of No. 2 is input in the subsequent individual recognition processing, the face image is determined to belong to the face feature amount group 2603 having the dictionary ID 2601 of No. 2. The face image is then correctly classified and displayed in the person group of No name1 on the UI display.

As described above, according to the present exemplary embodiment, the image processing apparatus 115 updates the person ID linking information of the face dictionary in response to the user's correction on the UI display without changing the dictionary IDs in the face dictionary. As a result, the image processing apparatus 115 can display person groups person by person on the UI. In the subsequent individual recognition processing, the image processing apparatus 115 can correctly display the person groups on the UI. This can save the user the trouble of correcting the registered information of the face dictionary. In other words, the user's single correction operation can prevent incorrect person groups from being displayed on the UI in the subsequent individual recognition processing.

The image processing apparatus 115 changes only the correspondence between the dictionary IDs and the person IDs, i.e., the person ID linking information according to a user operation without changing the dictionary IDs. This can suppress a drop in the recognition accuracy of the face dictionary.

In the present exemplary embodiment, the person ID of the combining destination (No name1) is used as the person ID of the combined person group. However, this is not restrictive. A new person group generated by combining the person groups of No name1 and No name2 on the UI may be named as appropriate. For example, as illustrated in FIG. 11, if the number of images classified as No name2 is greater than the number of images classified as No name1, the image processing apparatus 115 may use the person ID of the person group including the greater number of images, i.e., No name2 as the combined person ID. Alternatively, if either one of the person IDs is No nameXX that is not input by the user and the other person ID is father which is input by the user, then the image processing apparatus 115 may use father to give priority to the user input.

The layout generation unit 205 can perform the subsequent automatic layout generation processing by using the face recognition information of the thus improved accuracy to improve the accuracy of automatically generated layouts.

A second exemplary embodiment is similar to the first exemplary embodiment except the display processing on the UI and the processing for updating the face dictionary. A redundant description will be omitted.

In FIG. 11, suppose, for example, that angry father is classified as No name1 and smiling father is classified as No name2. The user makes an operation to name both the person groups father. Specifically, the user makes an operation to change No name1 into father and change No name2 into father. By such an operation, the user indicates that No name1 and No name2 are the same father. In the present exemplary embodiment, the image processing apparatus 115 correctly reflects the user's operation information upon the face dictionary to improve the subsequent recognition accuracy.

Figure 28:
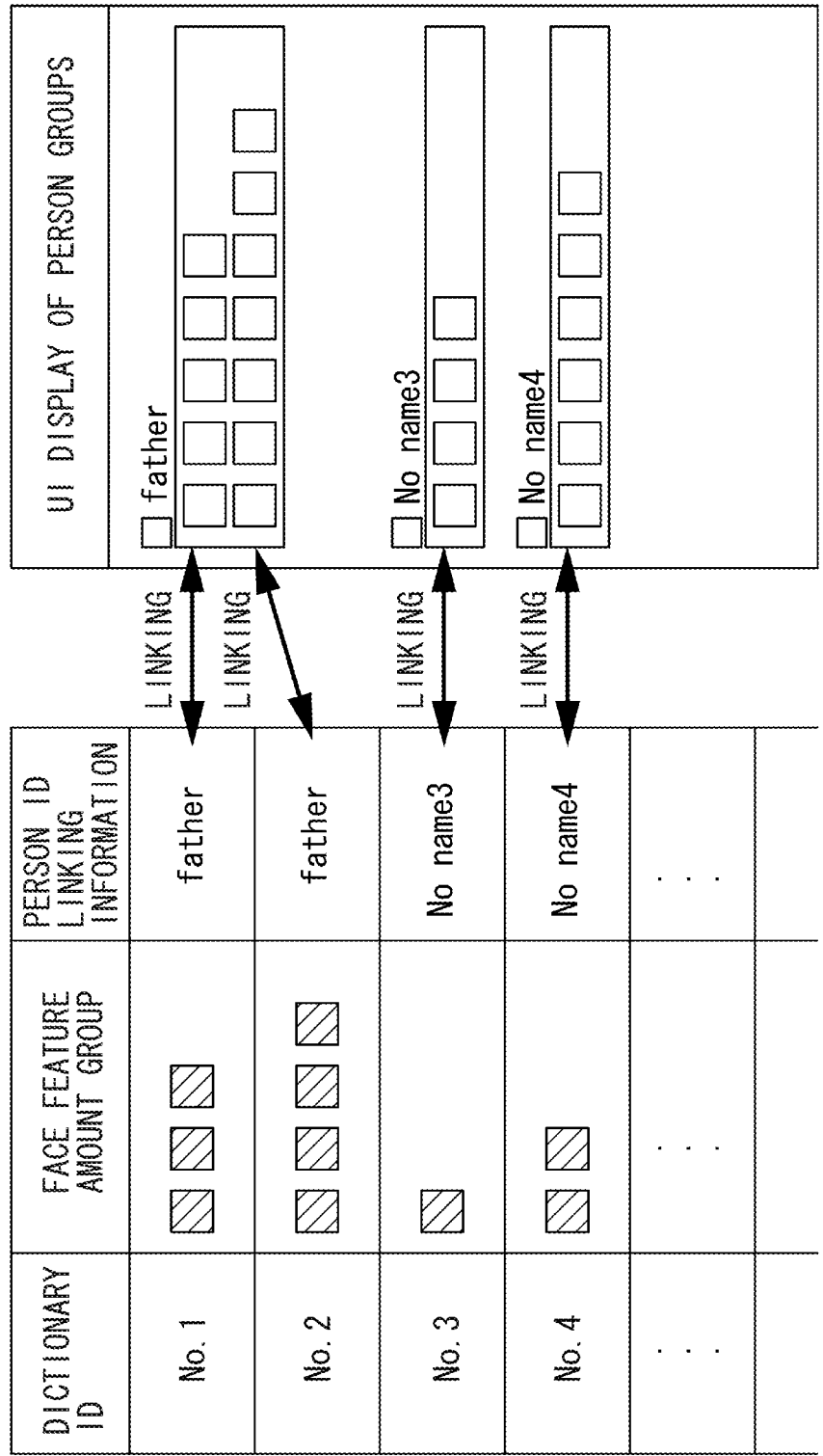
FIG. 28 illustrates linking between dictionary IDs and person IDs according to the second exemplary embodiment.

FIG. 28 is a diagram illustrating the internal configuration of the face dictionary and the UI display after the foregoing correction. As illustrated in FIG. 28, when the user changes the person IDs to father on the UI display, the image processing apparatus 115 in response combines the person groups of No name1 and No name2 into one person group on the UI. Specifically, the image processing apparatus 115 displays the images included in the person group of No name1 of FIG. 11 and the images included in the person group of No name2 as one person group. Meanwhile, the image processing apparatus 115 corrects the linking between the dictionary IDs and the person IDs, i.e., corrects the person ID linking information in the face dictionary. Consequently, in FIG. 28, the single person ID (=father) on the UI display is linked with a plurality of dictionary IDs.

As illustrated in FIG. 11, the correspondence between the number of dictionary IDs and the number of person IDs before the correction is 2:2. As illustrated in FIG. 28, the correspondence between the number of dictionary IDs and the number of person IDs after the correction is 2:1. That is, by reflecting the user operation, the image processing apparatus 115 displays the uncorrected person groups of No name1 and No name2 as the same person group having one person ID of father on the UI display. Meanwhile, the image processing apparatus 115 increases the number of dictionary IDs corresponding to the one person ID in the face dictionary. More specifically, the images based on the dictionary ID of No. 1 and the images based on the dictionary ID of No. 2 are displayed as the same person group on the UI display while the dictionary ID of No. 1 and the dictionary ID of No. 2 continue being separately managed in the face dictionary without the stored face feature amounts being updated.

As described above, in the present exemplary embodiment, the image processing apparatus 115 changes person groups displayed on the UI display according to corrections of the names of the person groups on the UI display. Meanwhile, the image processing apparatus 115 updates the person ID linking information of the face dictionary without updating the dictionary IDs. As a result, the image processing apparatus 115 can display the person groups person by person on the UI. In the subsequent individual recognition processing, the image processing apparatus 115 can correctly display the person groups on the UI. This can save the user the trouble of correcting registered information of the face dictionary. In other words, the user's single correction operation can prevent incorrect person groups from being displayed on the UI in the subsequent individual recognition processing.

The image processing apparatus 115 changes only the correspondence between the dictionary IDs and the person IDs, i.e., the person ID linking information without changing the dictionary IDs. This can suppress a drop in the recognition accuracy of the face dictionary.

A third exemplary embodiment is similar to the first exemplary embodiment except the display processing on the UI and the processing for updating the face dictionary. A redundant description will be omitted.

Figure 29:
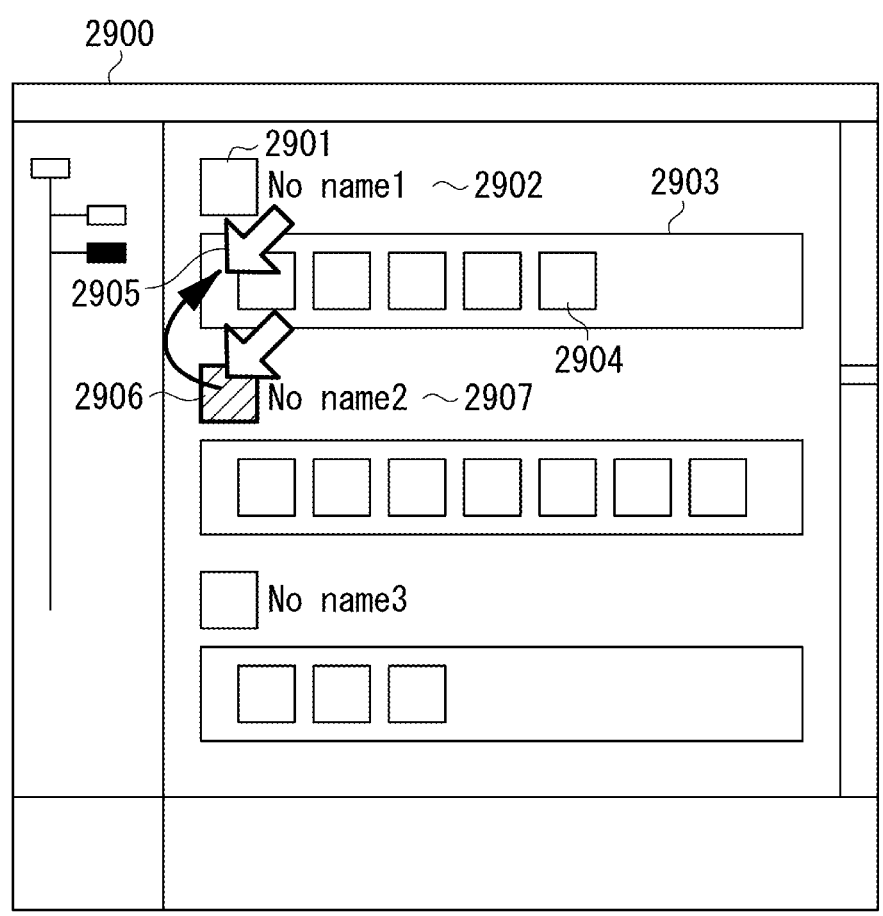
FIG. 29 illustrates the user's manual correction on a UI of a third exemplary embodiment.

FIG. 29 is a diagram illustrating an operation by the user.

A UI display screen 2900 illustrated in FIG. 29 displays person IDs in respective display areas 2902 and 2907. Representative face images 2901 and 2906 of No name1 and No name2 are displayed in areas on the left of the display areas 2902 and 2907, respectively. One or more face images 2904 of the person identified by the person ID displayed in the display area 2902 are displayed in a display area 2903.

In FIG. 29, suppose that the same person is classified as No name1 and No name2. In the following description, angry father shall be classified as No name1, and smiling father as No name2.

As illustrated in FIG. 29, the user operates a mouse pointer 2905 to drag the representative face image 2906 of No name2 to the display area 2903 of No name1. In the present exemplary embodiment, such a user operation can combine the person groups of No name1 and No name2 into one person group. In other words, the person groups of No name1 and No name2 are combined into a new person group.

In the present exemplary embodiment, the image processing apparatus 115 updates the registered information of the face dictionary according to the foregoing user operation. Specifically, the image processing apparatus 115 corrects the linking information about the dictionary IDs and the person IDs, i.e., the person ID linking information in the face dictionary to link the dictionary ID of No. 2 with No name1. As a result, the person group having the dictionary ID of No. 1 and the person group having the dictionary ID of No. 2, both having the person ID linking information of No name1, are displayed as one person group of No name1 on the UI.

In the present exemplary embodiment, the image processing apparatus 115 further performs processing for changing the representative face image of No name1. The method for the processing for changing a representative face image is not limited in particular. For example, if there is information manually input by the user such as listed in the foregoing Table 2, the image processing apparatus 115 may refer to the user's satisfaction ratings and reselect a representative face image. Specifically, the image processing apparatus 115 selects a face image having the highest satisfaction rating among all the face images classified as No name1 and No name2, and sets the selected face image as a representative face image of the combined person group of No name1. The image processing unit 115 may set a smiling face as a representative face image. That is, the image processing unit 115 may determine that smiling father of No name2 is more preferred for a representative face image than angry father of No name1, and change the representative face image of the combined person group to a face image of smiling father of No name2. A method for determining a smiling face (smiling face determination method) is not limited in particular, and a known method may be used. An example of the smiling face determination method includes making a determination about each face image based on the angles of the eyes and eyebrows and the angle of the mouth.

The images based on the dictionary ID of No. 1 and the images based on the dictionary ID of No. 2 are displayed as the same group on a not-illustrated UI display while the dictionary IDs of No. 1 and No. 2 continue being separately managed without the stored face feature amounts being updated.

As described above, in the present exemplary embodiment, the image processing apparatus 115 changes person groups displayed on the UI display according to the user's dragging operation of a representative face image on the UI display. Meanwhile, the image processing apparatus 115 updates the person ID linking information of the face dictionary without updating the dictionary IDs. As a result, the image processing apparatus 115 can display the person groups person by person on the UI. The image processing apparatus 115 can thus display correct person groups on the UI in the subsequent individual recognition processing. This can save the user the trouble of correcting the registered information of the face dictionary. In other words, the user's single correction operation can prevent incorrect person groups from being displayed on the UI in the subsequent individual recognition processing.

The image processing apparatus 115 changes only the correspondence between the dictionary IDs and the person IDs, i.e., the person ID linking information according to the user operation without changing the dictionary IDs. This can suppress a drop in the recognition accuracy of the face dictionary.

In the present exemplary embodiment, the image processing apparatus 115 automatically performs processing for revising and changing the representative face image of No name1. However, the image processing apparatus 115 may only update the information in the face dictionary without performing the processing for revising and changing a representative face image. The user may manually perform the processing for revising and changing a representative face image.

A fourth exemplary embodiment is similar to the first exemplary embodiment except the display processing on the UI and the processing for updating the face dictionary. A redundant description will be omitted.

Figure 30:
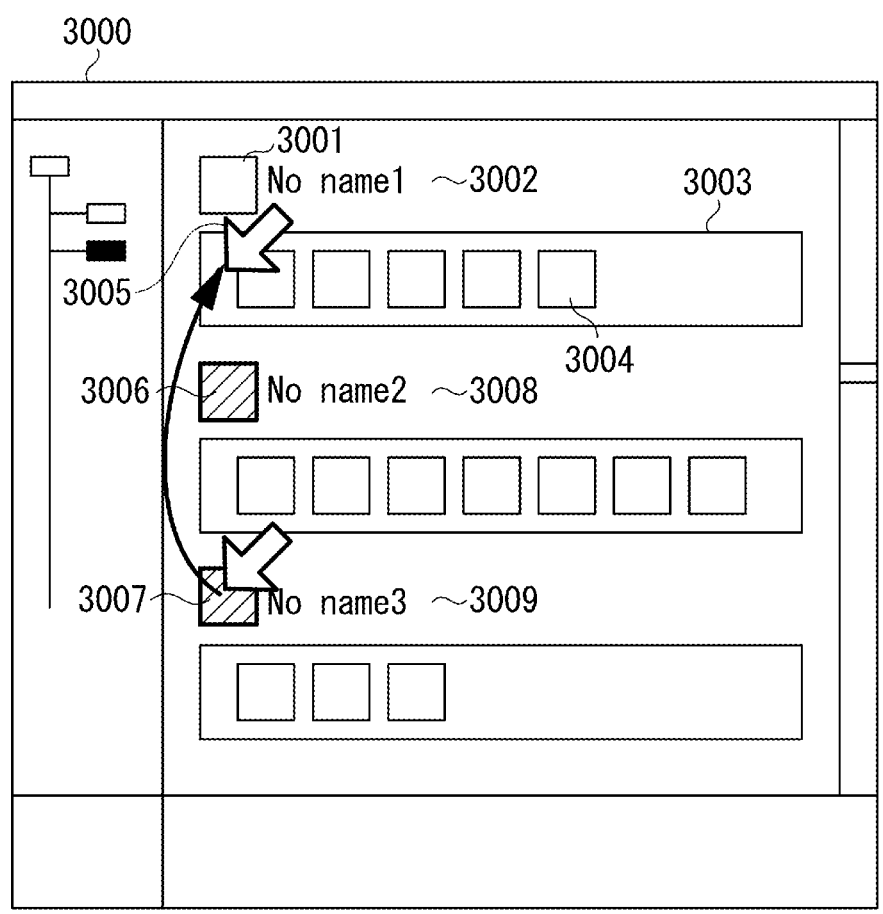
FIG. 30 illustrates the user's manual correction on a UI of a fourth exemplary embodiment.

FIG. 30 is a diagram illustrating an operation by the user.

A UI display screen 3000 illustrated in FIG. 30 displays person IDs in respective display areas 3002, 3008, and 3009. Representative face images 3001, 3006, and 3007 of No name1, No name2, and No name3 are displayed in areas on the left of the display areas 3002, 3008, and 3009, respectively. One or more face images 3004 of the person identified by the person ID displayed in the display area 3002 are displayed in a display area 3003.

In FIG. 30, suppose that the same person is classified as No name1, No name2, and No name3. For example, angry father is classified as No name1, smiling father as No name2, and crying father as No name3.

As illustrated in FIG. 30, the user operates a mouse pointer 3005 to select the representative face image 3006 of No name2 and the representative face image 3007 of No name3. The user then drags the representative face images 3006 and 3007 to the person group of No name1. In the present exemplary embodiment, such a user operation can combine the person groups of No name1, No name2, and No name3 into one person group. In other words, the person groups of No name1, No name2, and No name3 can be combined into a new person group.

In the present exemplary embodiment, the image processing apparatus 115 updates the registered information of the face dictionary according to the foregoing user operation. Specifically, the image processing unit 115 corrects the linking information about the dictionary IDs and the person IDs in the face dictionary, i.e., the person ID linking information to link both the dictionary IDs of No. 2 and No. 3 with No name1. As a result, the person groups having the dictionary IDs of No. 1, No. 2, and No. 3, which have the person ID linking information of No name1, are displayed as one person group of No name1 on the UI.

Figure 31:
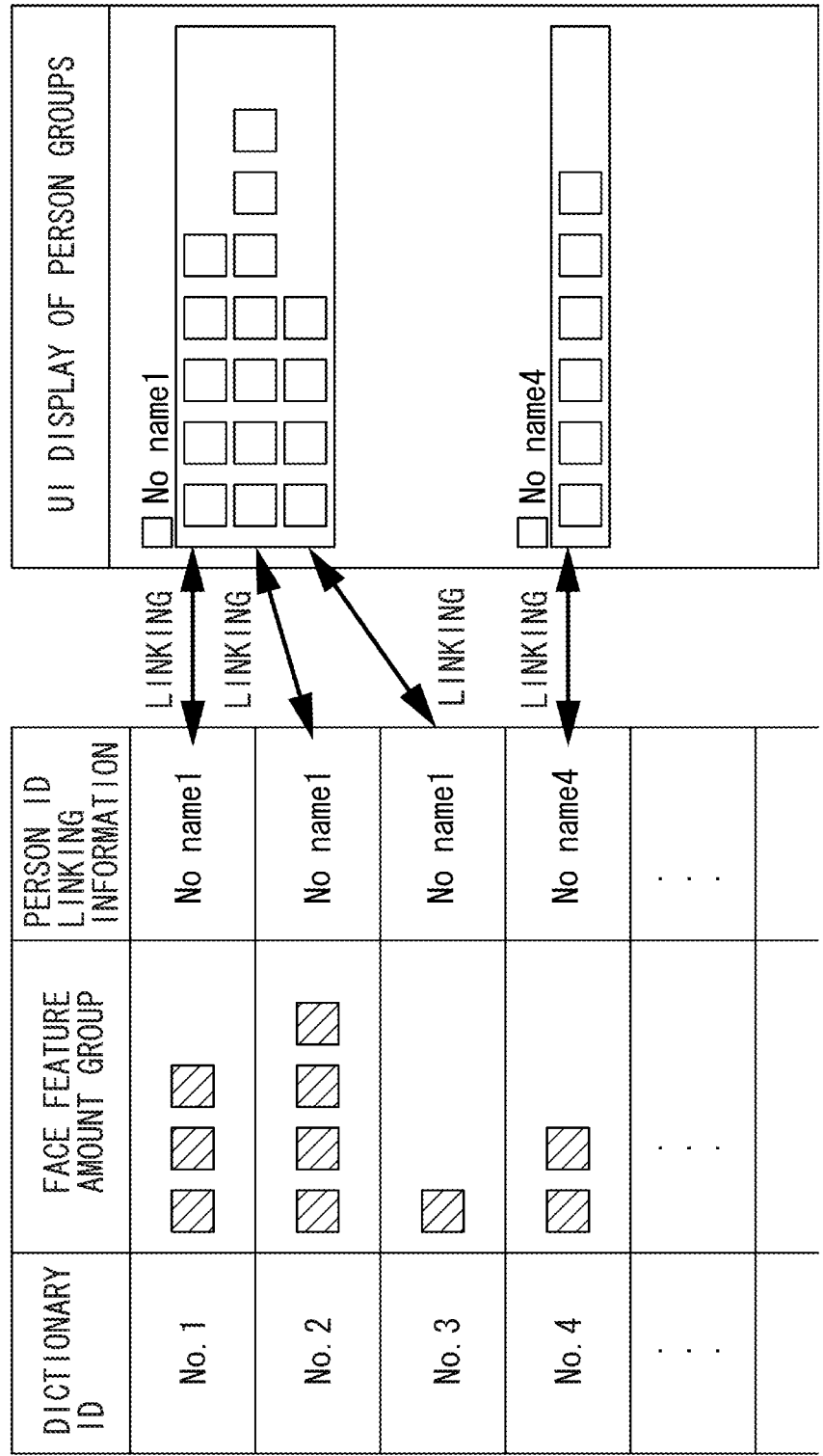
FIG. 31 illustrates linking between dictionary IDs and person IDs according to the fourth exemplary embodiment.

As illustrated in FIG. 31, the dictionary IDs and the person IDs that have been in a three-to-three correspondence before the operation are thereby linked in a three-to-one correspondence after the operation. In other words, the number of dictionary IDs corresponding to one person ID increases. On the UI display, the uncorrected person groups of No name1, No name2, and No name3 are displayed as the same person group with the one person ID of No name1. More specifically, the images based on the dictionary ID of No. 1, the images based on the dictionary ID of No. 2, and the images based on the dictionary ID of No. 3 are displayed as the same person group on the UI display. Meanwhile, the dictionary IDs of No. 1, No. 2, and No. 3 continue being separately managed in the face dictionary without the stored face feature amounts being updated.

As described above, in the present exemplary embodiment, the image processing apparatus 115 can combine three or more, a plurality of person groups into one person group at a time according to the user's dragging operation of representative face images on the UI display. By such an operation, the image processing apparatus 115 changes the person groups displayed on the UI display and updates the person ID linking information of the face dictionary without changing the dictionary IDs in the face dictionary. As a result, the image processing apparatus 115 can display the person groups person by person on the UI. The image processing apparatus 115 can thus display correct person groups on the UI in the subsequent individual recognition processing. This can save the user the trouble of correcting the registered information of the face dictionary. In other words, the user's single correction operation can prevent incorrect person groups from being displayed on the UI in the subsequent individual recognition processing.

The image processing apparatus 115 changes only the correspondence between the dictionary IDs and the person IDs, i.e., the person ID linking information according to the user operation without changing the dictionary IDs. This can suppress a drop in the recognition accuracy of the face dictionary.

A fifth exemplary embodiment is similar to the first exemplary embodiment except the display processing on the UI and the processing for updating the face dictionary. A redundant description will be omitted.

Figure 32:
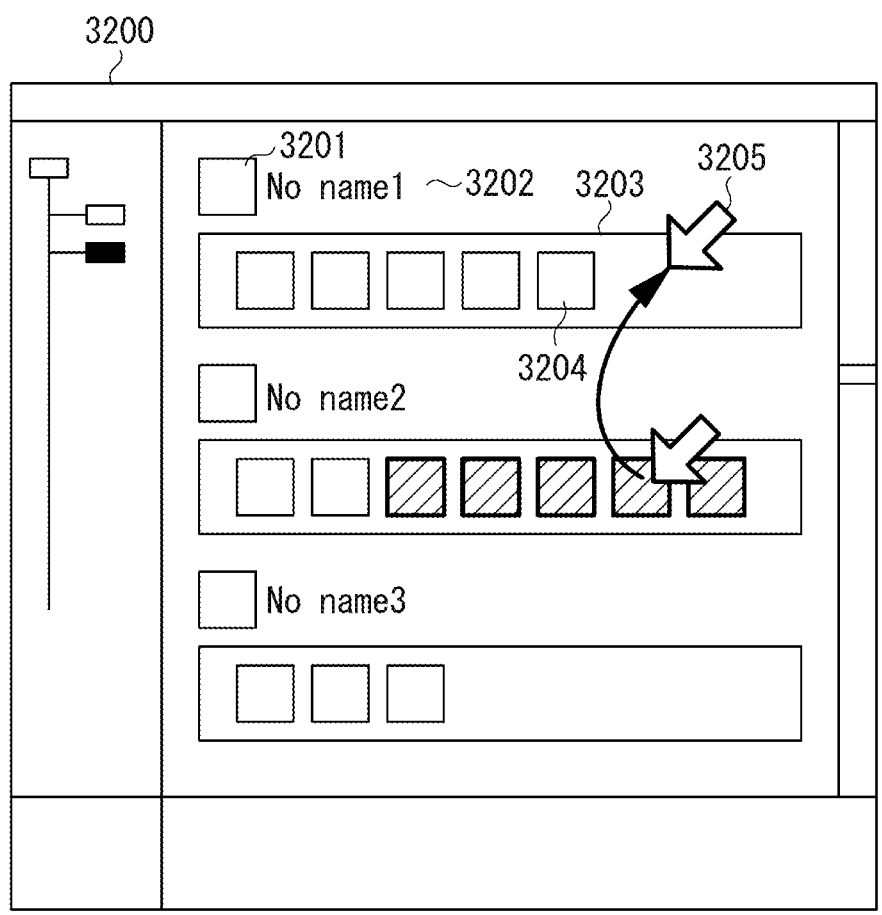
FIG. 32 illustrates the user's manual correction on a UI of a fifth exemplary embodiment.

FIG. 32 is a diagram illustrating an operation by the user. Referring to FIG. 32, a case where the user corrects some of the images in a person group, not all the images in the person group, will be described.

A UI display screen 3200 illustrated in FIG. 32 displays a person ID in a display area 3202. A representative face image 3201 of No name1 is displayed in an area on the left of the display area 3202. One or more face images 3204 of the person identified by the person ID displayed in the display area 3202 are displayed in a display area 3202.

In FIG. 32, suppose that the same person is classified as No name1 and No name2. In other words, the person who is supposed to be included in the person group of No name1 is classified as No name2. For example, in the following description, angry father is classified as No name1, and smiling father as No name2.

As illustrated in FIG. 32, the user operates a mouse pointer 3205 to select some of the images classified as No name2 and drag the selected images to No name1. Such a user operation can combine the person groups of No name1 and No name2 into one person group.

In FIG. 32, seven face images belong to the person group of No name2. Suppose that five face images illustrated hatched are moved to the person group of No name1 by the user operation. Suppose also that the face feature amount group having the dictionary ID of No. 2 linked with No name2 includes four face feature amounts. In the present exemplary embodiment, like the first exemplary embodiment, an upper limit of five is set to the number of face feature amounts registered in each face feature amount group in the face dictionary.

In the present exemplary embodiment, the image processing apparatus 115 updates the information in the face dictionary in response to the foregoing correction operation by the user. Specifically, as illustrated in FIGS. 26A and 26B, the image processing apparatus 115 corrects the linking information about the dictionary ID of No. 2 linked with No name2 so that the dictionary ID is linked with No name1. In the present exemplary embodiment, like the first exemplary embodiment, the correspondence illustrated in FIG. 26A becomes the state illustrated in FIG. 26B. The one-to-one correspondence between the number of dictionary IDs and the number of person IDs is thereby lost before and after the correction. The resulting one-to-two correspondence between the number of dictionary IDs and the number of person IDs enables displaying the person groups as a person group of the same No name1 on the UI display.

As described above, in the present exemplary embodiment, in response to the user' dragging operation of some of images included in a person group on the UI display, the image processing apparatus 115 can combine the person group to which the images to be moved belong and the person group to which the images to be moved are moved. By such an operation, the image processing apparatus 115 changes the person groups displayed on the UI display, and updates the person ID linking information of the face image without changing the dictionary IDs. As a result, the image processing apparatus 115 can display the person groups person by person on the UI. The image processing apparatus 115 can thus display correct person groups on the UI in the subsequent individual recognition processing. This can save the user the trouble of correcting the registered information of the face dictionary. In other words, the user's single correction operation can prevent incorrect person groups from being displayed on the UI in the subsequent individual recognition processing.

The image processing apparatus 115 changes only the correspondence between the dictionary IDs and the person IDs, i.e., the person ID linking information according to the user operation without changing the dictionary IDs. This can suppress a drop in the recognition accuracy of the face dictionary.

Note that in the present exemplary embodiment, the remaining two face images that have not been moved from No name2 to No name1 by the user are also displayed in the person group of No name1. If the remaining two face faces are of a person different from No name1, the user further needs to manually correct the two face images. The user's manual correction operations can be minimized, however, since a large number of images subsequently input will be able to be grouped into correct person groups. The present exemplary embodiment provides a higher effect as the ratio of the number of images to be moved by the user operation to the number of images included in the person group increases. The highest effect is obtained by moving 100% of the images. A condition for allowing the processing described in the present exemplary embodiment may be set.

For example, a condition may be set so that the foregoing dragging operation is enabled only when the number of images to be moved by the dragging operation is 90% or more of the number of images included in the person group to which the images belong.

While the exemplary embodiments of the present invention have been described above, a basic configuration of an exemplary embodiment of the present invention is not limited to the foregoing. The foregoing exemplary embodiments are a unit for obtaining the effects of an exemplary embodiment of the present invention, and it will be understood that similar other techniques and/or different parameters may be used without departing from the scope of an exemplary embodiment of the present invention as far as similar effects to those of an exemplary embodiment of the present invention are obtained.

The first to fifth exemplary embodiment have dealt with combining person groups. The image processing apparatus 115 may further combine a person group or group with previously-combined person groups. In other words, if two or more person IDs have already been combined, the image processing apparatus 115 can further combine one or more person IDs with the combined person ID and display the resultant as one person group on the UI display. The number of person groups that can be combined is not limited. The image processing apparatus 115 may combine four or more person groups into one person group.

The first, third, fourth, and fifth exemplary embodiments have dealt with the cases where the user operates a mouse pointer to drag an image group or groups and perform the processing for combining person groups. However, user operations are not limited to ones using a mouse pointer.

The foregoing exemplary embodiments have been described by using persons as examples of objects. However, objects are not limited to persons. Recognition processing of pets such as dogs and cats may be performed to recognize and set the pets as objects. Buildings and small articles can be recognized by performing recognition processing on edge-detected shapes. Buildings and small articles therefore can also be set as objects. In such cases, image processing can be performed in the same way as in the foregoing exemplary embodiments by extracting feature amounts of the objects and registering the extracted feature amounts into a dictionary.

In the foregoing exemplary embodiments, the image processing apparatus 115 performs display control to correct classifications of objects (persons) according to a correction instruction given by a user operation and display the objects on the display device 104. However, this is not restrictive. For example, the object classifications need not be displayed on the display device 104. In such a case, the image processing apparatus 115 may classify and manage objects extracted from image data object by object, update the association of the classifications of the objects with classification of face feature amounts in the face dictionary in the background when a correction instruction is given by the user, and correct and manage the classifications of the objects based on the update. Such management allows the automatic layout generation processing illustrated in FIG. 18 to generate appropriate layouts.

The foregoing exemplary embodiments have dealt with the cases of generating a single page of output product on which a plurality of images is arranged as a layout output product. However, an exemplary embodiment of the present invention may be applied to an album output of a plurality of pages.

According to an exemplary embodiment of the present invention, when the user corrects face information that has caused misrecognition, the image processing apparatus 115 can reflect the corrected information without reducing the accuracy of individual recognition. As a result, the image processing apparatus 115 subsequently can correctly classify faces of the same person with different face feature amounts as the same person. This can improve the accuracy of individual recognition.

With the improved accuracy of individual recognition, the image processing apparatus 115 can generate layouts more desirable by the user when automatically generating layout products by using individual recognition information.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

All the foregoing processing need not be implemented by software. A part or all of the processing may be implemented by hardware.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-153669 filed Jul. 9, 2012, which is hereby incorporated by herein in its entirety.

What is claimed is:

1. An apparatus comprising:
   a management unit configured to classify face feature information of a plurality of faces extracted from image data in units of similar face feature information into feature groups, and manage linking information for linking each feature group with a person group in a dictionary;
   a display control unit configured to cause a display unit to display face images based on image data for each person group based on the linking information managed by the management unit;
   a receiving unit configured to receive a user's correction instruction about the person group displayed on the display unit; and
   a processing unit configured to perform an associating process of person groups based on the user's correction instruction received by the receiving unit,
   wherein the processing unit is configured to, if the user's correction instruction is received by the receiving unit, performs the associating process by updating the linking information based on the user's correction instruction, and not to update the classification of the feature groups, and
   wherein one or more of the management unit, the display control unit, the receiving unit, or the processing unit is implemented by a processor and a memory.

2. The apparatus according to claim 1, wherein the processing unit is configured to, if the user's correction instruction is received by the receiving unit, associate two or more of feature groups with one person group by updating the linking information.

3. The apparatus according to claim 1, wherein the display control unit is configured to update display of face images for each person group based on updating of the association by the processing unit.

4. The apparatus according to claim 1, wherein the display control unit is configured to cause the display unit to further display representative images of the respective person group.

5. The apparatus according to claim 4, wherein the display control unit is configured to update the representative images based on updating of the linking information association by the processing unit.

6. The apparatus according to claim 5, wherein the display control unit is configured to, if the user's correction instruction is received by the receiving unit and the processing unit updates the linking information so that two or more of the feature groups are associated with one person group, cause the display unit to display a representative image that has been set for one of the two or more feature groups, the one feature group including a greater number of faces, as a representative image of a person group obtained by combining two or more feature groups.

7. The apparatus according to claim 4, wherein the processing unit performs the associating process if the receiving unit receives a user's operation to move the representative face image of a first person group to a display area of a second person group as the user's correction instruction.

8. The apparatus according to claim 1, wherein a number of feature amounts included in a feature group managed by the management unit is smaller than or equal to a number of faces included in a person group associated with the feature group.

9. The apparatus according to claim 1, wherein the processing unit performs the associating process if the receiving unit receives a user's operation to move an entire first person group displayed on the display unit to a second person group displayed on the display unit as the user's correction instruction.

10. The apparatus according to claim 1, wherein the processing unit performs the associating process if the receiving unit receives a user's operation to correct a name of a person group as the user's correction instruction and the name of two or more person groups are the same.

11. The apparatus according to claim 1, wherein the processing unit performs the associating process if the receiving unit receives a user's operation to move one or more face images included in a first person group displayed on the display unit to a display area of a second person group as the user's correction instruction.

12. A method comprising:
   classifying face feature information of a plurality of faces extracted from image data in units of similar face feature information into feature groups, and managing linking information for linking each feature group with a person group in a dictionary;

displaying face images based on image data for each person group based on the managed linking information;

receiving a user's correction instruction about the displayed person group; and performing an association process of person groups based on the received user's correction instruction, wherein if the user's correction instruction is received in the receiving, updating the linking information based on the user's correction instruction and not updating the classification of the feature groups.

13. The method according to claim 12, wherein association is performed if the user's correction instruction is received, associate two or more of feature groups with one person group by updating the linking information.

14. The method according to claim 12, wherein displaying face images for each person group is updated based on the updating of association process.

15. The method according to claim 12, wherein association is performed if the user's operation is received to move an entire first person group on display to a second person group on display as the user's correction instruction.

16. The method according to claim 12 wherein association is performed if user's operation is received to correct a name of a person group as the user's correction instruction and the name of two or more person groups are the same.

17. The method according to claim 12, wherein association is performed if user's operation is received to move the representative face image of a first person group to a display area of a second person group as the user's correction instruction.

18. The method according to claim 12, wherein association is performed if the user's operation is received to move one or more face images included in a first person group displayed on the display area of a second person group as the user's correction instruction.

19. A non-transitory computer-readable recording medium that causes a computer to perform a method, the method comprising:

classifying face feature information of a plurality of faces extracted from image data in units of similar face feature information into feature groups, and managing linking information for linking each feature group with a person group in a dictionary;

displaying face images based on image data for each person group based on the managed linking information;

receiving a user's correction instruction about the displayed person group; and performing an association process of person groups based on the received user's correction instruction, wherein if the user's correction instruction is received in the receiving, updating the linking information based on the user's correction instruction and not updating the classification of the feature groups.

* * * * *